United States Patent
Sato et al.

(10) Patent No.: US 10,951,601 B2
(45) Date of Patent: Mar. 16, 2021

(54) INFORMATION PROCESSING APPARATUS AND INFORMATION PROCESSING METHOD

(71) Applicant: SONY CORPORATION, Tokyo (JP)

(72) Inventors: Naoyuki Sato, Tokyo (JP); Hirotake Ichikawa, Tokyo (JP); Seiji Suzuki, Kanagawa (JP); Masato Shimakawa, Tokyo (JP)

(73) Assignee: SONY CORPORATION, Tokyo (JP)

( * ) Notice: Subject to any disclaimer, the term of this patent is extended or adjusted under 35 U.S.C. 154(b) by 247 days.

(21) Appl. No.: 16/087,459

(22) PCT Filed: Feb. 8, 2017

(86) PCT No.: PCT/JP2017/004474
§ 371 (c)(1),
(2) Date: Sep. 21, 2018

(87) PCT Pub. No.: WO2017/169144
PCT Pub. Date: Oct. 5, 2017

(65) Prior Publication Data
US 2019/0109836 A1    Apr. 11, 2019

(30) Foreign Application Priority Data
Mar. 31, 2016    (JP) .............................. JP2016-070967

(51) Int. Cl.
| H04L 29/06 | (2006.01) |
| G06F 21/62 | (2013.01) |
| G06F 21/12 | (2013.01) |
| H04L 29/08 | (2006.01) |

(52) U.S. Cl.
CPC ............ *H04L 63/08* (2013.01); *G06F 21/121* (2013.01); *G06F 21/629* (2013.01); *H04L 63/10* (2013.01); *H04L 63/105* (2013.01); *H04L 67/22* (2013.01)

(58) Field of Classification Search
CPC ....... H04L 63/08; H04L 63/108; H04L 63/10; G06F 21/121
See application file for complete search history.

(56) References Cited

U.S. PATENT DOCUMENTS

2007/0050369 A1*   3/2007   Stiegler .................. G06F 21/53
2010/0293106 A1*   11/2010   Rhoads .................. G06Q 30/02
                                                                                             705/330

(Continued)

FOREIGN PATENT DOCUMENTS

| JP | 10-247152 A | 9/1998 |
| JP | 2003-223421 A | 8/2003 |

(Continued)

OTHER PUBLICATIONS

Matsumoto, et al., "Support of Regional Emergency Medical Services by ICT—A proof experiment of the urgent medical support by video transmission system—", IEICE Technical Report, ICM2011-6, May 2011, 53-58 pages.

(Continued)

*Primary Examiner* — Shawnchoy Rahman
(74) *Attorney, Agent, or Firm* — Chip Law Group

(57) ABSTRACT

Provided is an information processing apparatus that includes a control authority managing unit configured to change a control authority for a device by a first user on a basis of whether or not a status is a monitored status. The monitored status is a status in which the device or the first user is under supervision of a second user having a management authority for the device, and the first user does not have the management authority for the device.

16 Claims, 23 Drawing Sheets

(56) References Cited

U.S. PATENT DOCUMENTS

| | | | | |
|---|---|---|---|---|
| 2013/0086663 A1* | 4/2013 | Roth | ................. | H04L 9/3242 |
| | | | | 726/7 |
| 2016/0142402 A1* | 5/2016 | Kim | ................. | H04W 4/02 |
| | | | | 726/4 |
| 2017/0063875 A1* | 3/2017 | Yanase | ................. | H04L 63/0876 |
| 2017/0099597 A1* | 4/2017 | Choi | ................. | H04W 8/005 |
| 2017/0279818 A1* | 9/2017 | Milazzo | ................. | H04L 63/145 |
| 2018/0302416 A1* | 10/2018 | Einberg | ................. | H04L 9/3226 |

FOREIGN PATENT DOCUMENTS

| | | | | |
|---|---|---|---|---|
| JP | 2004-046430 A | | 2/2004 | |
| JP | 2005-301721 A | | 10/2005 | |
| JP | 2011-086012 A | | 4/2011 | |
| JP | 2011101219 A | * | 5/2011 | ......... H04N 5/23209 |
| JP | 2012-043144 A | | 3/2012 | |
| JP | 2013-045278 A | | 3/2013 | |

OTHER PUBLICATIONS

Tanimoto, et al., "Campus PKI Common Specifications for University Authentication Cooperation", Special Edition on Internet Architecture Papers supporting Smart Society Research News Flash, vol. J94-B No. 10, 1363-1388 pages.

Tanimoto, et al., "Campus PKI Common Specifications for University Authentication Cooperation", vol. J94-B, No. 10, Oct. 2011, pp. 1383-1388.

Matsumoto, et al., "Support of Regional Emergency Medical Services by ICT—A Proof Experiment of the Urgent Medical Support by Video Transmission System", IEICE Technical Report ICM2011, The Institute of Electronics, Information and Communication Engineers, 2011, pp. 53-58.

International Search Report and Written Opinion of PCT Application No. PCT/JP2017/004474, dated May 16, 2017, 11 pages of English Translation and 08 pages of ISRWO.

International Preliminary Report on Patentability of PCT Application No. PCT/JP2017/004474, dated Oct. 11, 2018, 12 pages of English Translation and 05 pages of IPRP.

Matsumoto et al, "Support of Regional Emergency Medical Services by ICT : A proof experiment of the urgent medical support by video transmission system", IEICE Technical Report, May 5, 2011, vol. 111, No. 30, pp. 53 to 58.

Tanimoto et al., "Campus PKI Common Specifications for University Authentication Cooperation", The Transactions of the Institute of Electronics, Information and Communication Engineers B, Oct. 1, 2011, vol. J94-B, No. 10, pp. 1383 to 1388.

* cited by examiner

FIG. 19
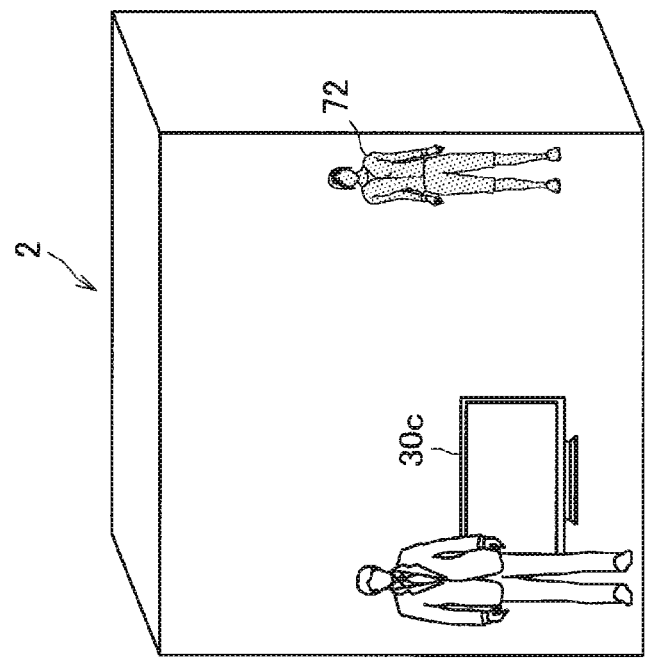
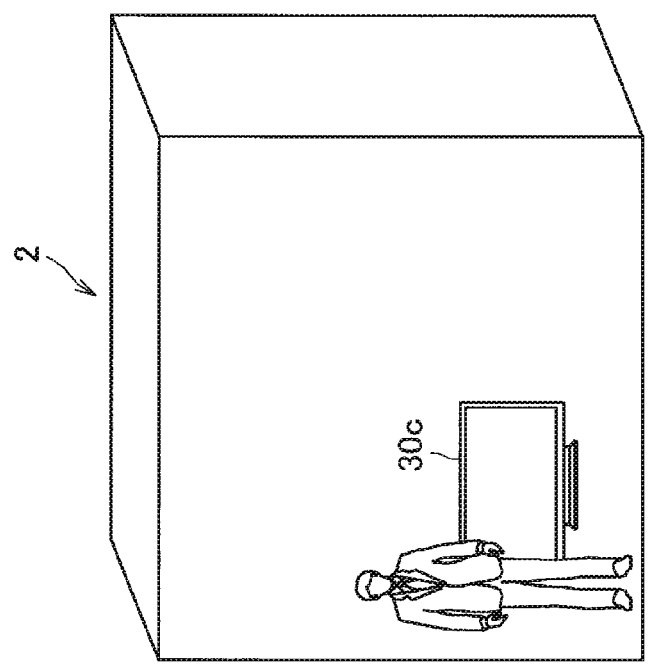

INFORMATION PROCESSING APPARATUS AND INFORMATION PROCESSING METHOD

CROSS REFERENCE TO RELATED APPLICATIONS

This application is a U.S. National Phase of International Patent Application No. PCT/JP2017/004474 filed on Feb. 8, 2017, which claims priority benefit of Japanese Patent Application No. JP 2016-070967 filed in the Japan Patent Office on Mar. 31, 2016. Each of the above-referenced applications is hereby incorporated herein by reference in its entirety.

TECHNICAL FIELD

The present disclosure relates to an information processing apparatus, an information processing method, and a program.

BACKGROUND ART

In the past, various kinds of techniques for controlling a device arranged in a building such as a house on the basis of a manipulation of a user at a remote site have been proposed.

For example, a technique of determining whether or not remote control can be performed on an indoor device through an outdoor mobile device on the basis of a verification result of an attribute certificate presented from the mobile device is disclosed in Patent Literature 1 below.

CITATION LIST

Patent Literature

Patent Literature 1: JP 2004-46430A

DISCLOSURE OF INVENTION

Technical Problem

However, in the technology described in Patent Literature 1, it is determined whether or not control of the indoor device can be performed using only a verification result of content of the attribute certificate. For this reason, for example, in a case in which the content of the attribute certificate is valid, control over the indoor device can be granted indefinitely.

In this regard, the present disclosure proposes an information processing apparatus, an information processing method, and a program which are novel and improved and enable a user to appropriately restrict control over a device.

Solution to Problem

According to the present disclosure, there is provided an information processing apparatus including: a control authority managing unit configured to change a control authority for a device by a first user on a basis of whether or not a status is a monitored status.

In addition, according to the present disclosure, there is provided an information processing method including: changing, by a processor, a control authority for a device by a first user on a basis of whether or not a status is a monitored status.

In addition, according to the present disclosure, there is provided a program causing a computer system to function as: a control authority managing unit configured to change a control authority for a device by a first user on a basis of whether or not a status is a monitored status.

Advantageous Effects of Invention

As described above, according to the present disclosure, it is possible for a user to appropriately restrict control of a device. Further, the effect described here is not necessarily limiting, and any effect described in the present disclosure may be included.

BRIEF DESCRIPTION OF DRAWINGS

FIG. 19 is an explanatory diagram illustrating a display example of a video of a person located at a remote site according to the fourth embodiment.

MODE(S) FOR CARRYING OUT THE INVENTION

Figure 1:
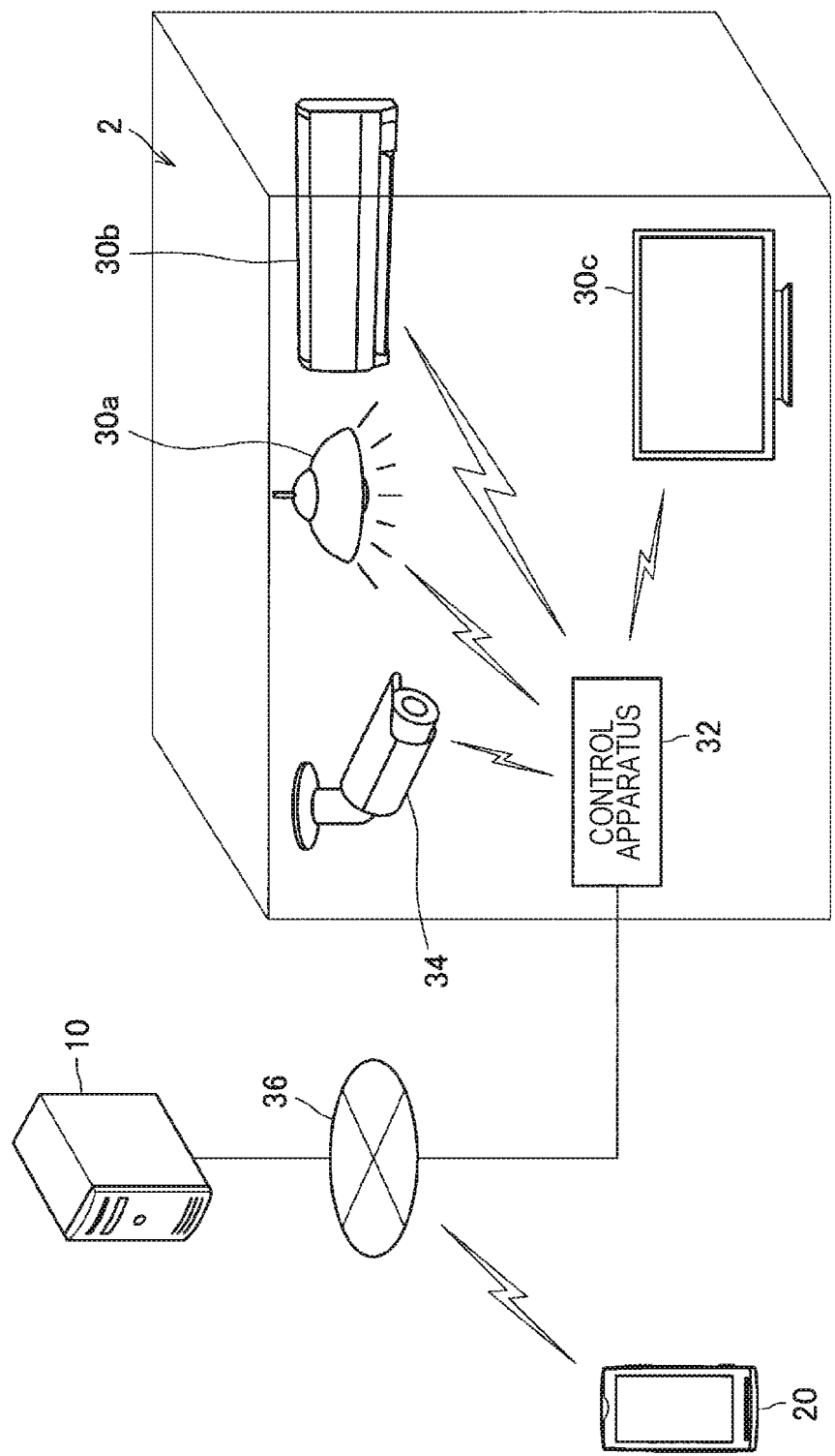
FIG. 1 is an explanatory diagram illustrating a configuration example of an information processing system according to a first embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Further, in this specification and the drawings, a plurality of constituent elements having substantially the same functional configuration are also distinguished by attaching different letters after the same reference numerals. For example, a plurality of components having substantially the same functional configuration are distinguished like a user terminal 20a and a user terminal 20b if necessary. Here, in a case in which it is not necessary to particularly distinguish each of a plurality of constituent elements having substantially the same functional configuration, only the same reference numerals are attached. For example, in a case in which it is not necessary to particularly distinguish the user terminal 20a and the user terminal 20b from each other, they are simply referred to as a user terminal 20.

Further, "modes for carrying out the invention" will be described in accordance with the order of items below.
1. First embodiment
2. Second embodiment
3. Third embodiment
4. Fourth embodiment
5. Fifth embodiment
6. Hardware configuration
7. Modified example

1. FIRST EMBODIMENT

1-1. Configuration of Information Processing System

1-1-1. Overview

First, a first embodiment will be described. FIG. 1 is an explanatory diagram illustrating a configuration example of an information processing system according to the first embodiment. As illustrated in FIG. 1, an information processing system according to the first embodiment includes a server 10, a user terminal 20, a device 30, a control apparatus 32, an indoor camera 34, and a communication network 36.

In the first embodiment, a situation in which an authority holder 6 has a management authority for a space such as a room 2 in which one or more types of devices 30 are arranged, and a manipulator 4 having no management authority for the space controls the device 30 in the space is assumed. Here, the manipulator 4 is an example of a first user in the present disclosure, and the authority holder 6 is an example of a second user in the present disclosure. Further, the authority holder 6 may be one person or a plurality of persons. Further, the manipulator 4 may be a person who performs a business related to the device 30 such as a contractor or a repairer or may be an acquaintance such as a family member or a friend of the authority holder 6. Further, the manipulator 4 may be one person or may be a plurality of persons.

The manipulator 4 can directly manipulate the device 30 in the room 2 or remotely control the device 30 via the communication network 36 to be described later by manipulating a predetermined terminal (the user terminal 20, or the like) at a remote site from the room 2. Alternatively, the manipulator 4 can remotely control the device 30 through a robot (not illustrated) located in the same space (for example, the room 2) as the device 30 by manipulating the robot using a predetermined terminal at a remote site from the room 2.

Meanwhile, if the manipulator 4 is assumed to be able to control the device 30 arranged in the room 2 (for which the authority holder 6 has the management authority) indefinitely, control undesired by the authority holder 6 is likely to be performed, for example, unauthorized control is likely to be performed.

In this regard, the server 10 according to the first embodiment was developed in light of the foregoing. According to the first embodiment, the server 10 can change the control authority for the device 30 by the manipulator 4 on the basis of whether or not it is a monitored status. Accordingly, the control for the device 30 by the manipulator 4 is appropriately limited. Hereinafter, a configuration of the information processing system according to the first embodiment will be described in further detail with reference to FIG. 1.

1-1-2. Server 10

The server 10 is an example of the information processing apparatus in the present disclosure. The server 10 is an apparatus for managing the control authority for the device 30. As will be described in detail later, for example, in a case in which the device 30 of a manipulation target is in the monitored status, the server 10 can give the control authority for the device 30 to the manipulator 4.

1-1-2-1. Monitored Status

Here, the monitored status is a status in which the user can know about information such as a status of the device 30 of the manipulation target by a sense of vision or another sense (for example, a sense of hearing or a sense of touch). For example, the monitored status may be a status in which the device 30 of the manipulation target or the manipulator 4 is under the supervision of the authority holder 6. As an example, in a case in which the authority holder 6 is located in the space in which the device 30 of the manipulation target is arranged, the monitored status may be a status in which the device 30 or the manipulator 4 is located within or near the field of view of the authority holder 6. Here, the status in which the device 30 is located near the field of view is, for example, a status in which a distance between the position of the device 30 and the field of view of the authority holder 6 is within a predetermined range decided on the basis of history information. Further, in a case in which there are a plurality of authority holders 6, a status in which the device 30 of the manipulation target or the manipulator 4 is under the supervision of at least one of the plurality of authority holders 6 corresponds to the monitored status.

Figure 2A:
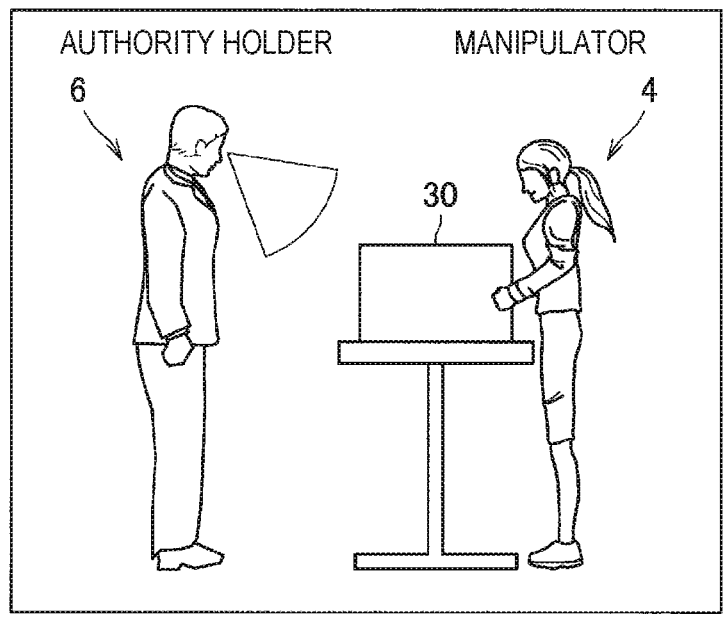
FIGS. 2A and 2B are explanatory diagram illustrating an example of a monitored status.

Here, the above content will be described in further detail with reference to FIGS. 2A and 2B. Further, FIG. 2A illustrates, for example, an example of a situation in which the manipulator 4 is a repair worker for an air conditioner 30*b* and is located in front of the air conditioner 30*b*. Further, the authority holder 6 is an owner of the room 2 and is located in the room 2. A status in which, in the space in which the device 30 (the air conditioner 30*b*) of the manipulation target is arranged, the manipulator 4 directly manipulates the device 30, and the device 30 or the manipulator 4 is located within the field of view of the authority holder 6 as illustrated in FIG. 2A corresponds to the monitored status.

Figure 2B:
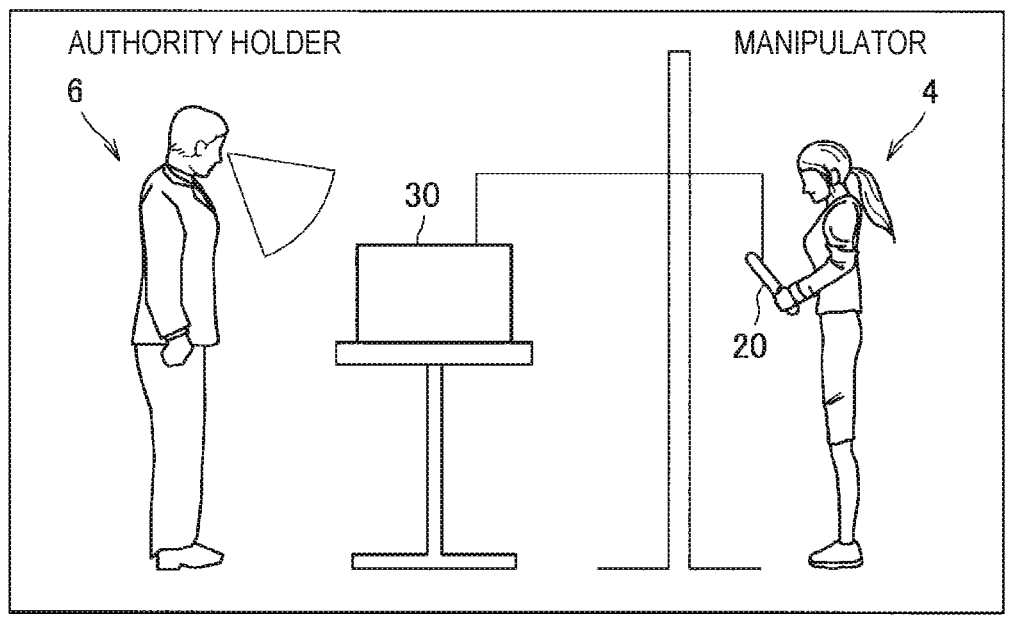

Further, FIG. 2B illustrates an example of a situation in which the manipulator 4 is located at a remote site and trying to remotely control the air conditioner 30*b*. A status in which the manipulator 4 is manipulating the device 30 of the manipulation target from the remote site, and the device 30 is located within the field of view of the authority holder 6 as illustrated in FIG. 2B also corresponds to the monitored status.

Further, in a case in which the authority holder 6 is located at the remote site from the space in which the device 30 of the manipulation target is located, the monitored status may be a status in which a display unit displaying a video obtained by photographing the device 30 or the manipulator 4 (for example, the display unit of the user terminal 20 used by the authority holder 6 or the like) is located within or near the field of view of the authority holder 6. Here, the video may be a video captured by, for example, the indoor camera 34 to be described later or a camera carried by the manipulator 4, or the like.

Figure 3A:
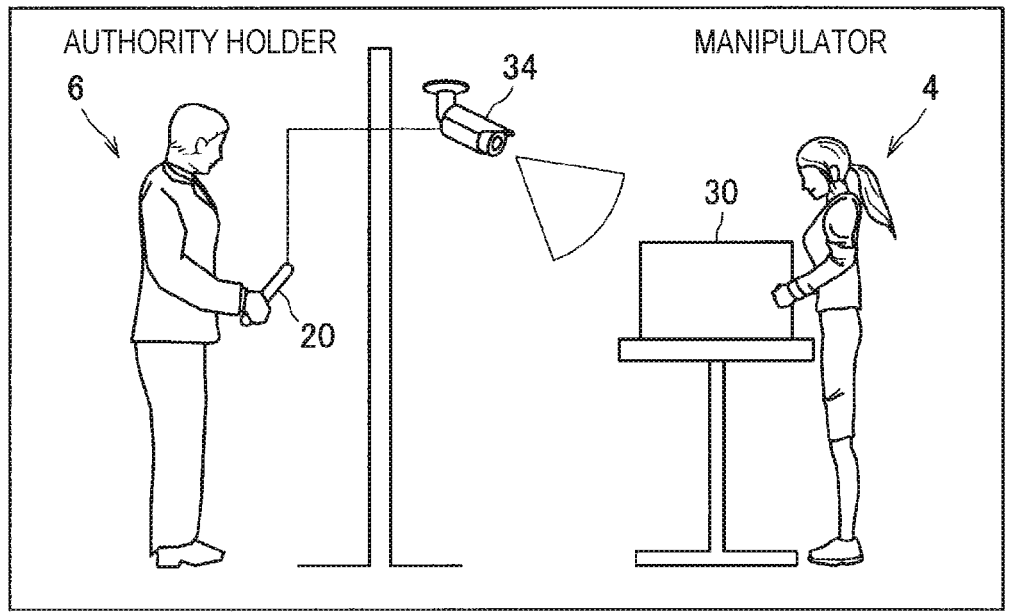
FIGS. 3A and 3B are explanatory diagram illustrating an example of a monitored status.

Here, the above content will be described in further detail with reference to FIGS. 3A and 3B. Further, FIG. 3A illustrates an example of a situation in which (similarly to FIG. 2A) the manipulator 4 is a repair worker for the air conditioner 30*b* and located in front of the air conditioner 30*b*. Further, the authority holder 6 is an owner of the room 2 and located at a remote site from the room 2. A status in which, in the space in which the device 30 (the air conditioner 30*b*) of the manipulation target is arranged, the manipulator 4 is directly manipulating the device 30, and the user terminal 20 displaying a video obtained by photographing the device 30 or the manipulator 4 through the indoor camera 34 is located within the field of view of the authority holder 6 as illustrated in FIG. 3A corresponds to the monitored status.

Figure 3B:
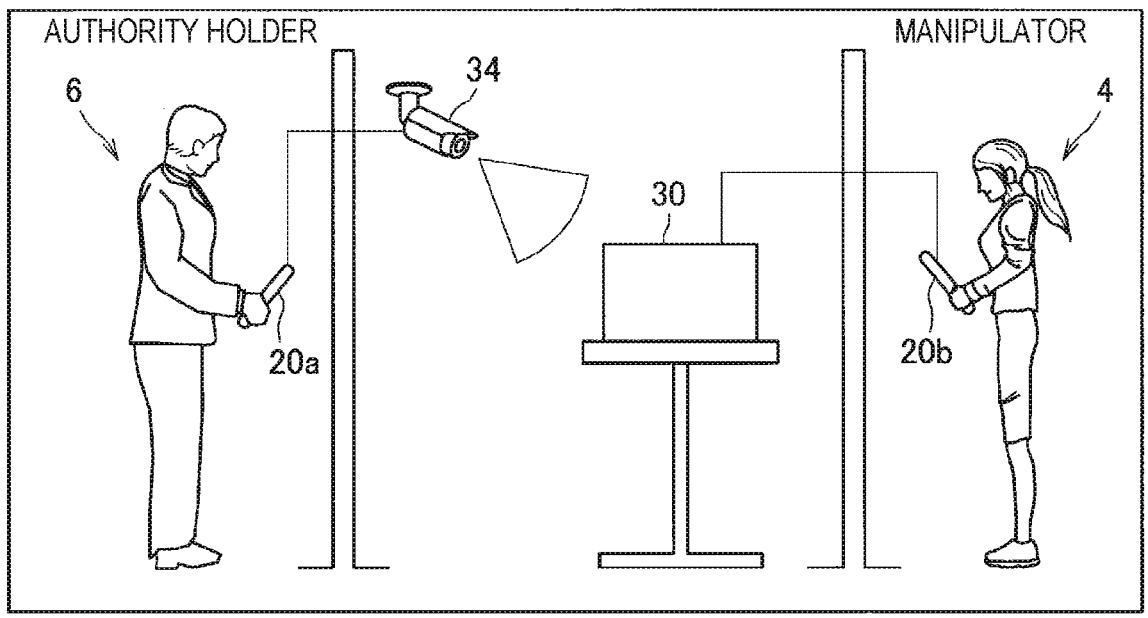

FIG. 3B illustrates an example of a situation in which the authority holder 6 and the manipulator 4 are located at the remote sites, and the manipulator 4 is trying to remotely control the air conditioner 30*b*. A status in which the manipulator 4 is manipulating the device 30 of the manipulation target at the remote site, and the user terminal 20 displaying the video obtained by photographing the device 30 through the indoor camera 34 is located within the field of view of the authority holder 6 as illustrated in FIG. 3B corresponds to the monitored status.

Alternatively, the monitored status may be a status in which the authority holder 6 is located in or near the space in which the device 30 of the manipulation target is located. Here, for example, in a case in which the space is a room, a hallway adjacent to the room or an adjacent room corresponds to an area near the space.

Further, as a modified example, the monitored status may be a status in which the device 30 of the manipulation target is being recorded. For example, even if the authority holder 6 is not viewing the video obtained by photographing the device 30 in real time, a case in which the device 30 is being recorded (that is, in a case in which the authority holder 6 can confirm manipulation content for the device 30 later) can be the monitored status.

1-1-3. User terminal 20

The user terminal 20 is an information processing terminal used by the authority holder 6 or the manipulator 4. The user terminal 20 includes a display unit that displays a display screen, a communication unit that establishes a connection with the communication network 36, and an input unit that receives an input of the user. Further, FIG. 1 illustrates an example in which the user terminal 20 is a smartphone, but the present disclosure is not limited to this example. For example, the user terminal 20 may be a tablet terminal, a general-purpose personal computer (PC), a game machine, or a wearable device such as a head mounted display (HMD) or an augmented reality (AR) glass.

For example, as illustrated in FIGS. 3A and 3B, the user terminal 20 of the authority holder 6 can receive the video captured by the indoor camera 34 and display the received video in real time. Further, the authority holder 6 can monitor a manipulation state of the manipulator 4 on the device 30 by viewing the video.

1-1-4. Control Apparatus 32

The control apparatus 32 is an apparatus for controlling an operation of the device 30 arranged in the room 2. For example, the control apparatus 32 performs power ON/OFF of the device 30 and controls of various kinds of functions of the device 30 for each of a plurality of devices 30 arranged in the room 2. Further, the control apparatus 32 can control a device indicated by control information received from the server 10 in accordance with the control information.

1-1-5. Device 30

The device 30 is a device arranged in the room 2. Examples of the device 30 include a light source 30*a*, an air conditioner 30*b*, a television receiver 30*c*, a stove, a coffee maker, a microwave, a digital versatile disc (DVD) recorder, a hard disk drive (HDD) recorder, a curtain, a shutter, an air purifier, a humidifier, a refrigerator, a washing machine, a water heater, a ventilating fan, and a vacuum cleaner.

1-1-6. Indoor Camera 34

The indoor camera 34 is a camera arranged in the room 2. The indoor camera 34 can be arranged at a position and in a direction in which all or a part of the device 30 arranged in the room 2 can be photographed. Further, in a case in which a start of a manipulation on a certain device 30 by the manipulator 4 is detected, the indoor camera 34 can change the direction or perform zooming so that the device 30 can be photographed. Further, the indoor camera 34 may be, for example, a surveillance camera or a camera installed in a robot located in the room 2.

1-1-7. Communication Network 36

The communication network 36 is a wired or wireless transmission path of information transmitted from an apparatus connected to the communication network 36. Examples of the communication network 36 may include a public line network such as a telephone network, the Internet, and a satellite communication network, various local area networks (LANs) including Ethernet (a registered trademark), and a wide area network (WAN). Further, the communication network 36 may include a dedicated network such as an Internet protocol-virtual private network (IP-VPN).

Further, the configuration of the information processing system according to the first embodiment is not limited to the example described above. For example, the information processing system may not include the control apparatus 32.

1-2. Configuration

Figure 4:
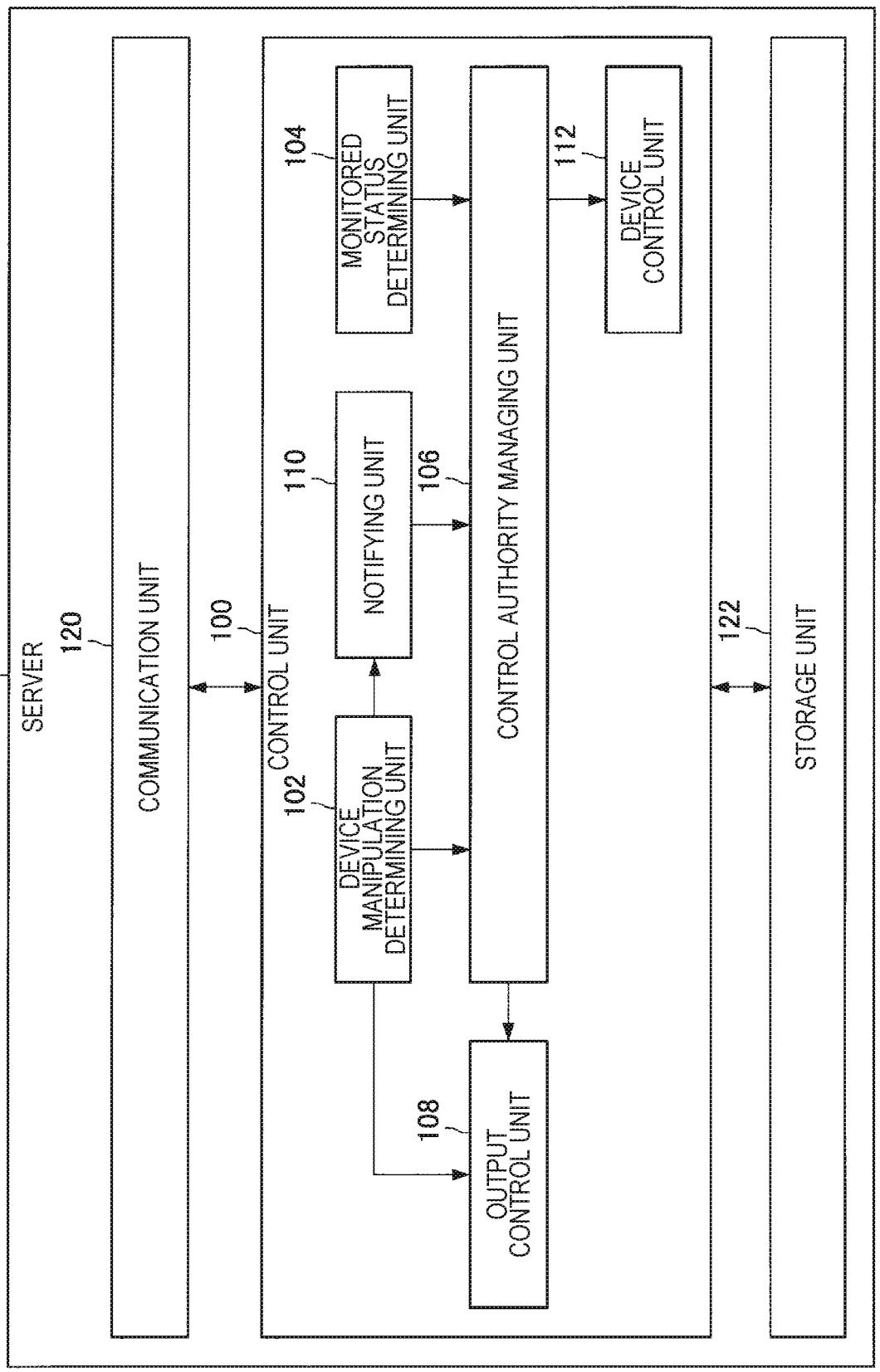
FIG. 4 is a functional block diagram illustrating a configuration example of a server 10 according to the first embodiment.

The configuration of the information processing system according to the first embodiment has been described above. Next, a configuration of the server 10 according to the first embodiment will be described in detail. FIG. 4 is a functional block diagram illustrating a configuration example of the server 10 according to the first embodiment. As illustrated in FIG. 4, the server 10 has a control unit 100, a communication unit 120, and a storage unit 122.

1-2-1. Control Unit 100

The control unit 100 generally controls an operation of the server 10 using hardware such as a central processing unit (CPU) 150 and a random access memory (RAM) 154 (to be described later) which are installed in the server 10. Further, as illustrated in FIG. 4, the control unit 100 includes a device manipulation determining unit 102, a monitored status determining unit 104, a control authority managing unit 106, an output control unit 108, a notifying unit 110, and a device control unit 112.

1-2-2. Device Manipulation Determining Unit 102

The device manipulation determining unit 102 determines whether or not a manipulation for the device 30 is started on the basis of a detection result for the manipulator 4. Further, the device manipulation determining unit 102 specifies the device 30 of the manipulation target of the manipulator 4. Here, the detection result for the manipulator 4 includes, for example, a detection result such as a positional relation between the device 30 of the manipulation target and the manipulator 4, a motion of the body of the manipulator 4, or content of a manipulation performed by the manipulator 4 on the manipulation device (the user terminal 20 or the like).

For example, in a case in which the manipulator 4 is detected to be positioned within the space in which the device 30 is arranged, the device manipulation determining unit 102 determines whether or not the manipulation on any one of the devices 30 is started by the manipulator 4 on the basis of a detection result received from various kinds of sensors such as the indoor camera 34 or the infrared sensor arranged in the space.

Further, in a case in which the manipulator 4 is detected to be located at the remote site, the device manipulation determining unit 102 determines whether or not the manipulation on any one of the devices 30 in the space is started by the manipulator 4 on the basis of information input to the manipulation device used by the manipulator 4 or a detection result received from various sensors such as a camera or an infrared sensor arranged at the remote site.

1-2-3. Monitored Status Determining Unit 104

The monitored status determining unit 104 determines whether or not the device 30 of the manipulation target specified by the device manipulation determining unit 102 is in the monitored status. For example, the monitored status determining unit 104 determines whether or not the device 30 of the manipulation target is in the monitored status on the basis of the positional relation between the space in which the device 30 of the manipulation target is arranged and the authority holder 6.

1-2-3-1. First Determination Example

For example, the monitored status determining unit 104 determines whether or not the status is the monitored status by determining whether or not the device 30 of the manipulation target is located within (or near) the field of view of the authority holder 6. More specifically, the monitored status determining unit 104 determines that the status is the monitored status in a case in which the device 30 is located within the field of view of the authority holder 6, and determines that that status is not the monitored status in a case in which the device 30 is not located within the field of view of the authority holder 6. For example, the monitored status determining unit 104 determines whether or not the device 30 of the manipulation target is located within the field of view of the authority holder 6 by determining the position of the authority holder 6 and the direction of his or her face on the basis of the detection result received from various kinds of sensors such as the indoor camera 34 or the infrared sensor arranged in the space. Alternatively, the monitored status determining unit 104 determines whether or not the device 30 of the manipulation target is located within the field of view of the authority holder 6 on the basis of a detection result received from various kinds of sensors installed in a wearable device (for example, an image captured by an external camera, a detection result of an inclination measured by a gyro sensor, or the like) in a case in which the user terminal 20 being used the authority holder 6 is a wearable device.

1-2-3-2. Second Determination Example

Alternatively, the monitored status determining unit 104 determines whether or not the status is the monitored status by determining whether or not the display unit displaying a video obtained by photographing the device 30 of the manipulation target is located within (near) the field of view of the authority holder 6. More specifically, the monitored status determining unit 104 determines that the status is the monitored status in a case in which the display unit is located within the field of view of the authority holder 6, and determines that the status is not the monitored status in a case in which the display unit is not located within the field of view of the authority holder 6. For example, in a case in which the video captured by the indoor camera 34 is displayed on the display unit of the user terminal 20 of the authority holder 6, the monitored status determining unit 104 receives a photographing result of a in-camera installed near the display unit and determines that the display unit is located within the field of view of the authority holder 6. For example, in a case in which information indicating that the face of the authority holder 6 is photographed by the in-camera is received from the user terminal 20, the monitored status determining unit 104 determines that the display unit is located within the field of view of the authority holder 6. Further, in a case in which information indicating that the face of the authority holder 6 is not photographed by the in-camera is received from the user terminal 20, the monitored status determining unit 104 determines that the display unit is not located within the field of view of the authority holder 6.

1-2-3-3. Third Determination Example

Alternatively, the monitored status determining unit 104 can determine whether or not the status is the monitored status by determining whether or not the authority holder 6 is located within (or near) the space in which the device 30 of the manipulation target is located. More specifically, the monitored status determining unit 104 determines that the status is the monitored status in a case in which the authority holder 6 is located in the space and determines that the status is not the monitored status in a case in which the authority holder 6 is not located in the space. For example, the monitored status determining unit 104 receives current position information of the authority holder 6 such as a measurement result of a Global Positioning System (GPS) receiver of the user terminal 20 owned by the authority holder 6, and determines that the authority holder 6 is within (near) the space. Alternatively, the monitored status determining unit 104 determines whether or not the authority holder 6 is located within the space on the basis of a detection result received from various kinds of sensors such as the indoor camera 34 arranged in the space.

1-2-3-4. Fourth Determination Example

Alternatively, the monitored status determining unit 104 can determine whether or not the status is the monitored status on the basis of an access state of the user terminal 20 of the authority holder 6 with respect to the indoor camera 34. For example, in a case in which the user terminal 20 is detected to be accessing the indoor camera 34, the monitored status determining unit 104 determines that the status is the monitored status. Further, in a case in which the user terminal 20 is detected not to be accessing the indoor camera 34, the monitored status determining unit 104 determines that the status is not the monitored status.

1-2-3-5. Modified Example

Meanwhile, particularly, in a case in which the authority holder 6 performs the monitoring at the remote site, for example, when the authority holder 6 moves or the body of the authority holder 6 unconsciously moves, the field of view of the authority holder 6 may frequently move, and thus whether or not the status is the monitored status may frequently change. In this regard, as a modified example, the monitored status determining unit 104 may switch whether or not the status is the monitored status on the basis of an integral value of the length of time in which the display unit of the user terminal 20 is located within the field of view of the authority holder 6. For example, in a case in which the current status is not the monitored status and the integrated value of the length of time in which the display unit is located within the field of view of the authority holder 6 exceeds a predetermined period of time, the monitored status determining unit 104 switches the current status to the monitored status. Further, in a case in which the current status is the monitored status, and the integral value of the length of time in which the display unit deviates from the field of view of the authority holder 6 exceeds a predetermined period of time, the monitored status determining unit 104 switches the current status to a non-monitored status.

1-2-4. Control Authority Managing Unit 106

1-2-4-1. First Authority Grant Example

The control authority managing unit 106 changes control authority of the manipulator 4 for the device 30 of the manipulation target on the basis of a determination result obtained by the monitored status determining unit 104. For example, in a case in which the status is determined to be the monitored status, the control authority managing unit 106 grants the control authority for the device 30 of the manipulation target to the manipulator 4. Further, in a case in which the status is determined not to be the monitored status, the control authority managing unit 106 does not grant the control authority for the device 30 of the manipulation target to the manipulator 4.

1-2-4-2. Second Authority Grant Example

Alternatively, the control authority managing unit 106 can change the control authority to be granted to the manipulator 4 in accordance with a determination result of whether or not the status is the monitored status. For example, in a case in which the status is determined not to be the monitored status, the control authority managing unit 106 grants narrower control authority for the device 30 of the manipulation target to the manipulator 4 than in a case in which the status is determined to be the monitored status. As an example, in a case in which the status is determined to be the monitored status, the control authority managing unit 106 grants the manipulator 4 control authority under which both "ON" and "OFF" of the device 30 of the manipulation target can be controlled. Further, in a case in which the status is determined not to be the monitored status, the control authority managing unit 106 grants the manipulator 4 control authority under which only "OFF" of the device 30 can be controlled (that is, "ON" cannot be controlled).

Alternatively, in a case in which the status is determined not to be the monitored status, the control authority managing unit 106 can grant the manipulator 4 control authority having a narrower range of settable values for a parameter of the device 30 of the manipulation target than in a case in which the status is determined to be the monitored status. For example, in a case in which the device 30 of the manipulation target is the air conditioner 30b, when the status is determined not to be the monitored status, the control authority managing unit 106 may grant the manipulator 4 a control authority having a narrower range of settable temperatures for a temperature setting than when the status is determined to be the monitored status. Alternatively, for example, in a case in which the device 30 of the manipulation target is a toaster oven, when the status is determined not to be the monitored status, the control authority managing unit 106 may grant the manipulator 4 a control authority having a smaller maximum value of a settable heating time for a setting of a heating time than when the status is determined to be the monitored status. In other words, in a case in which the status is the monitored status, a time having a higher risk is allowed to be set than in a case in which the status is not the monitored status. Alternatively, for example, in a case in which the device 30 of the manipulation target is the television receiver 30c, when the status is determined not to be the monitored status, the control authority managing unit 106 may grant the manipulator 4 a control authority having a smaller number of displayable channels than when the status is determined to be the monitored status.

1-2-4-3. Third Authority Grant Example

Alternatively, the control authority managing unit 106 can change the control authority to be granted to the manipulator 4 in accordance with a type of the device 30 of the manipulation target. For example, in a case in which the status is determined not to be the monitored status, and the type of the device 30 of the manipulation target is the device 30 for which a predetermined flag is set, the control authority managing unit 106 does not grant the control authority for the device 30 to the manipulator 4. Here, for example, the flag may be set for the device 30 that generates heat of equal to or greater than a predetermined amount of heat (a stove, a drier, a heater, or the like), and the flag may not be set for the device 30 that does not generate heat of less than a predetermined amount of heat (the lighting 30a, the television receiver 30c, or the like). Alternatively, the flag may be set for the device 30 having a predetermined wattage or more, and the flag may not be set for the device 30 having a wattage less than a predetermined wattage.

1-2-4-4. Fourth Authority Grant Example

Further, in a case in which there are a plurality of authority holders 6, the control authority managing unit 106 can change the control authority of the manipulator 4 for the device 30 of the manipulation target depending on which authority holder 6 is monitoring the device 30 of the manipulation target. For example, in a case in which at least one of the authority holders 6 monitoring the device 30 of the manipulation target has a management authority for the space in which the device 30 is arranged (or the device 30), the control authority managing unit 106 grants the control authority for the device 30 to the manipulator 4. Further, in a case in which all of the authority holders 6 monitoring the device 30 of the manipulation target do not have the management authority for the space (or the device 30), the control authority managing unit 106 does not grant the control authority for the device 30 to the manipulator 4.

1-2-4-5. First Modified Example

Further, as a modified example, the control authority managing unit 106 can further change the control authority to be granted to the manipulator 4 on the basis of a relation between the manipulator 4 and the authority holder 6. For example, in a case in which the control of the device 30 by the manipulator 4 is approved in advance, even when the status is determined not to be the monitored status, the control authority managing unit 106 may temporarily grant the control authority for the device 30 of the manipulation target to the manipulator 4. As an example, in a case in which a contract related to the control of the device 30 is made between the manipulator 4 and the authority holder 6, and information indicating that the contract is made is already registered in the storage unit 122 or the like in advance, for example, the control authority managing unit 106 may grant the control authority for the device 30 may be given to the manipulator 4 even when the status is determined not to be the monitored status. Further, in a case in which it is specified that the manipulator 4 and the authority holder 6 are, for example, family members or friends, even when the status is determined not to be the monitored status, the control authority managing unit 106 may grant the control authority for the device 30 of the manipulation target to the manipulator 4 (exceptionally). Further, the control authority managing unit 106 can specify that the manipulator 4 and the authority holder 6 are family members or friends on the basis of registration information in a predetermined social networking service (SNS), registration information in the storage unit 122, or the like.

Alternatively, the control authority managing unit 106 can change the control authority to be granted to the manipulator 4 on the basis of whether or not it is an emergency. For example, in the case of an emergency, the control authority managing unit 106 may grant the control authority for the device 30 of the manipulation target (exceptionally) to the manipulator 4 even when the status is determined not to be the monitored status. Here, examples of the emergency include the occurrence of a disaster such as an earthquake or a typhoon, the occurrence of a fire in the space in which the device 30 is arranged, and the occurrence of a crime or riot. For example, in a case in which information indicating the emergency is transmitted or a notification indicating the emergency is given in advance by the authority holder 6, the control authority managing unit 106 grants the control authority for the device 30 of the manipulation target (or the all the devices 30 arranged in the space) to the manipulator 4 even when the status is determined not to be the monitored status. Alternatively, in a case in which it is detected that an alarm is issued by an alarm apparatus (a fire alarm, a gas leak alarm, or the like) in the space in which the device 30 is arranged, the control authority managing unit 106 grants the control authority for the device 30 of the manipulation target (or the all the devices 30 arranged in the space) to the manipulator 4 even when the status is determined not to be the monitored status.

1-2-4-6. Second Modified Example

Further, as will be described in detail later, in a case in which an explicit instruction to grant the control authority to the manipulator 4 is received from the user terminal 20 of the authority holder 6, the control authority managing unit 106 can grant the control authority for the device 30 of the manipulation target to the manipulator 4 even when the status is determined not to be the monitored status.

1-2-5. Output Control Unit 108

1-2-5-1. First Control Example

The output control unit 108 controls an output of information to the user terminal 20. For example, the output control unit 108 causes a video captured by the indoor camera 34 to be displayed on the user terminal 20.

1-2-5-2. Second Control Example

Further, in a case in which the control authority for the device 30 of the manipulation target is not granted to the manipulator 4, the output control unit 108 can cause a UI indicating that the control authority is not granted to be displayed on the display unit (such as the user terminal 20) being viewed by the manipulator 4.

Figure 5:
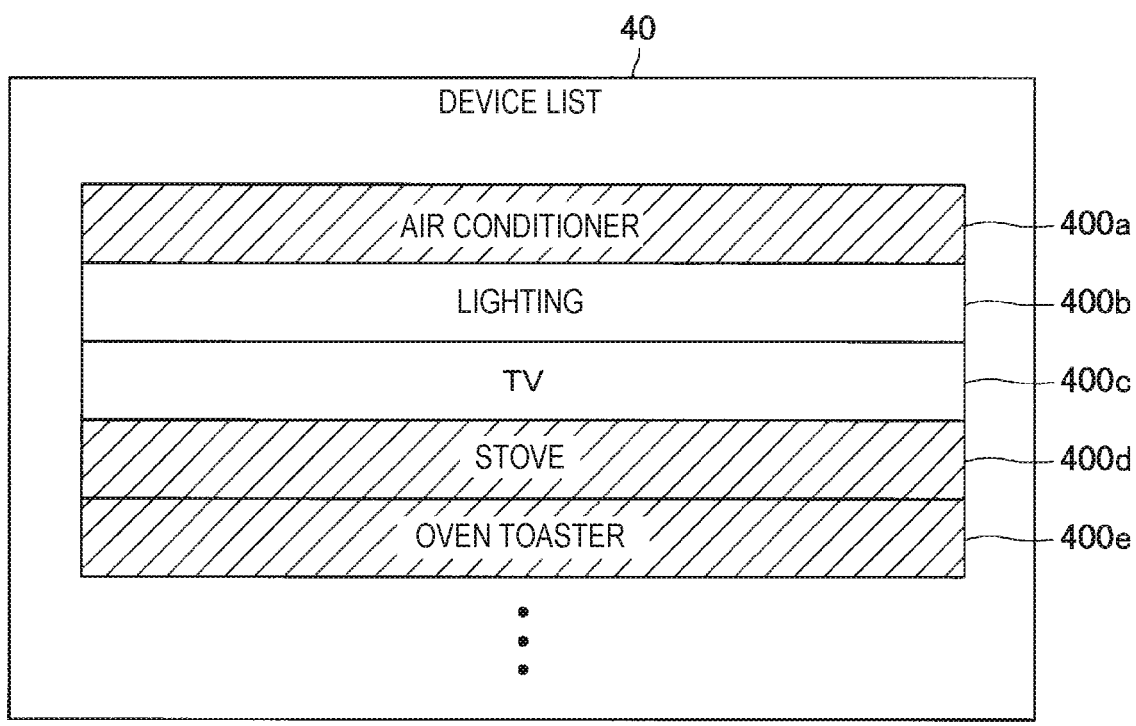
FIG. 5 is an explanatory diagram illustrating a display example of a device list according to the first embodiment.

For example, in a case in which a device list 40 in which a list of the devices 30 arranged in the space as illustrated in FIG. 5 is displayed is displayed on the display unit, the output control unit 108 causes the device 30 for which the control authority is not granted not to be displayed or causes the device 30 to be displayed in a different display color. Alternatively, the output control unit 108 causes the device 30 for which the control authority is not granted to be displayed on a manipulation screen displayed on the display unit in a gray-out form, in red color, a blurred form or causes a predetermined mark such as "x" to be displayed at or near a display position of the device 30. Alternatively, in a case in which a manipulation on the device 30 such as selection of a manipulation button of the device 30 is performed in the manipulation screen, the output control unit 108 performs display control for the manipulation screen so that no response is given or an error is output. Here, the error may be, for example, a message such as "Manipulation is not permitted. Please get permission from Mr. oo." According to such a display example, it is possible to cause a notification indicating that the device 30 is unable to be controlled to be given to the manipulator 4.

Alternatively, the output control unit 108 can control an output of a sound, vibration, or myoelectricity indicating that no control authority is not granted. For example, when the manipulator 4 attempts to manipulate the device 30 of the manipulation target, the output control unit 108 may cause a failure sound to be output to a speaker installed in a place (the room 2 or the remote site) in which the manipulator 4 is located, the user terminal 20 of the manipulator 4, or the like. Alternatively, the output control unit 108 may cause the user terminal 20 of the manipulator 4 to vibrate with a predetermined vibration pattern. Alternatively, in a case in which the manipulator 4 is wearing a dedicated apparatus on an arm or the like, the output control unit 108 may control the apparatus such that, for example, an electric stimulus for causing the arm not to move is given to the manipulator 4

1-2-6. Notifying Unit 110

The notifying unit 110 can notify the authority holder 6 of a request for granting the control authority for the device 30 or notify the authority holder 6 of a request for causing the authority holder 6 to monitor the device 30 on the basis of detection of a predetermined manipulation by the manipulator 4.

Figure 6:
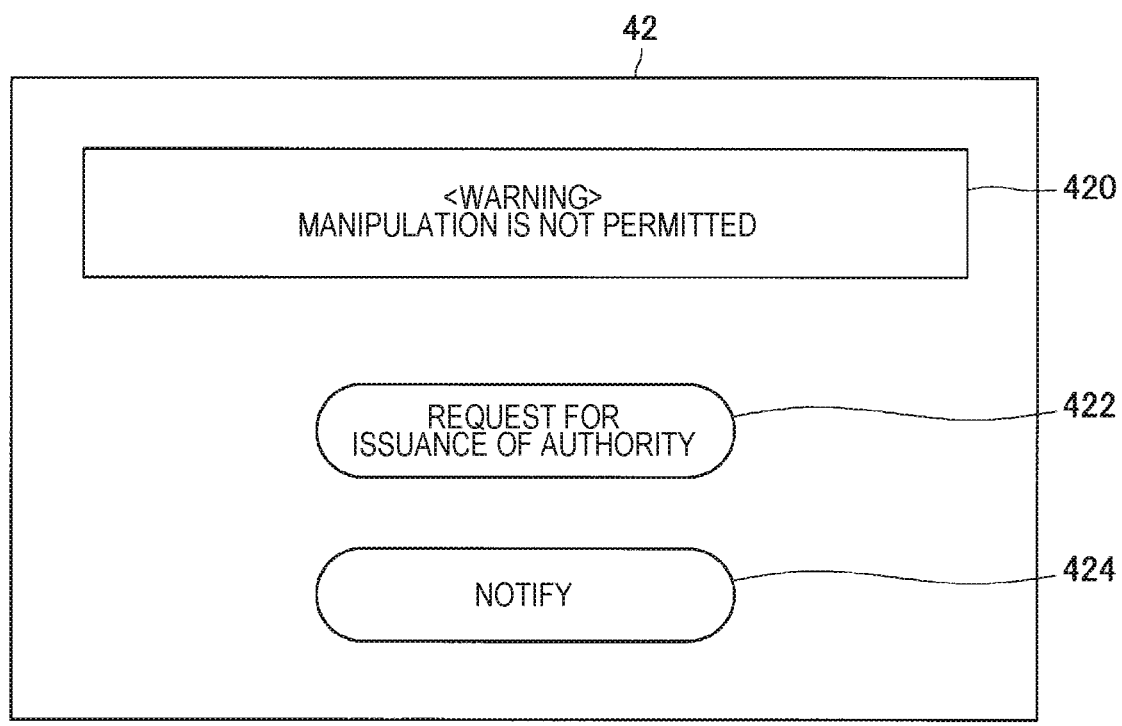
FIG. 6 is an explanatory diagram illustrating a display example of a warning screen according to the first embodiment.

Here, the above content will be described with reference to FIG. 6. FIG. 6 is an explanatory diagram illustrating a display example of a warning screen (a warning screen 42) displayed on the user terminal 20 of the manipulator 4 or the like in a case in which the manipulator 4 tries to manipulate the device 30 for which the control authority is not granted. As illustrated in FIG. 6, the warning screen 42 includes a warning message display field 420, a control authority grant request button 422, and a notification button 424. Here, for example, a message indicating that the control authority for the device 30 of the manipulation target is not granted to the manipulator 4 is displayed in the warning message display field 420. Further, the control authority grant request button 422 is a selection button for requesting the authority holder 6 to grant the control authority for the device 30 of the manipulation target. If the control authority grant request button 422 is selected by the manipulator 4, a notification indicating the selection is transmitted to the server 10, and the notifying unit 110 causes the communication unit 120 to transmit a request for granting the control authority for the device 30 to the user terminal 20 of the authority holder 6. Further, if the authority holder 6 inputs an approval to the user terminal 20 after the request is transmitted, an instruction to grant the control authority is transmitted to the server 10, and the control authority managing unit 106 can grant the control authority for the device 30 to the manipulator 4 (as described above).

Further, the notification button 424 is a selection button for giving a notification to the authority holder 6 so that it becomes the monitored status (that is, for giving a notification to the authority holder 6 so that the authority holder 6 monitors the device 30 of the manipulation target). If the notification button 424 is selected by the manipulator 4, a notification indicating the selection is transmitted to the server 10, and the notifying unit 110 causes the communication unit 120 to transmit a notification for causing the authority holder 6 to monitor the device 30 to the user terminal 20 of the authority holder 6. Further, when it becomes the monitored status after the notification is transmitted, the control authority managing unit 106 can grant the control authority for the device 30 to the manipulator 4 (as described above).

1-2-7. Device Control Unit 112

The device control unit 112 controls the device 30 of the manipulation target on the basis of the detection of the manipulation by the manipulator 4 in a case in which the control authority is granted to the manipulator 4 by the control authority managing unit 106. For example, in response to the detection of the manipulation by the manipulator 4, the device control unit 112 causes the communication unit 120 to transmit control information for causing the device 30 of the manipulation target to operate to the control apparatus 32. Alternatively, the device control unit 112 can cause the communication unit 120 to transmit the control information directly to the device 30 of the manipulation target in response to detection of manipulation by the manipulator 4.

1-2-8. Communication Unit 120

The communication unit 120 performs transmission and reception of information with other apparatuses. For example, in accordance with the control of the notifying unit 110, the communication unit 120 transmits a notification of the request for granting the control authority for the device 30 or a notification of the request for causing the authority holder 6 to monitor the device 30 to the user terminal 20 of the authority holder 6. Further, the communication unit 120 receives the detection results from various kinds of sensors such as the indoor camera 34 arranged in the room 2.

1-2-9. Storage Unit 122

The storage unit 122 stores various kinds of data and various kinds of software.

Further, the configuration of the server 10 according to the first embodiment is not limited to the above example. For example, in a case in which the control apparatus 32 has the function of the device control unit 112, the server 10 may not include the device control unit 112.

1-3. Operation

Figure 7:
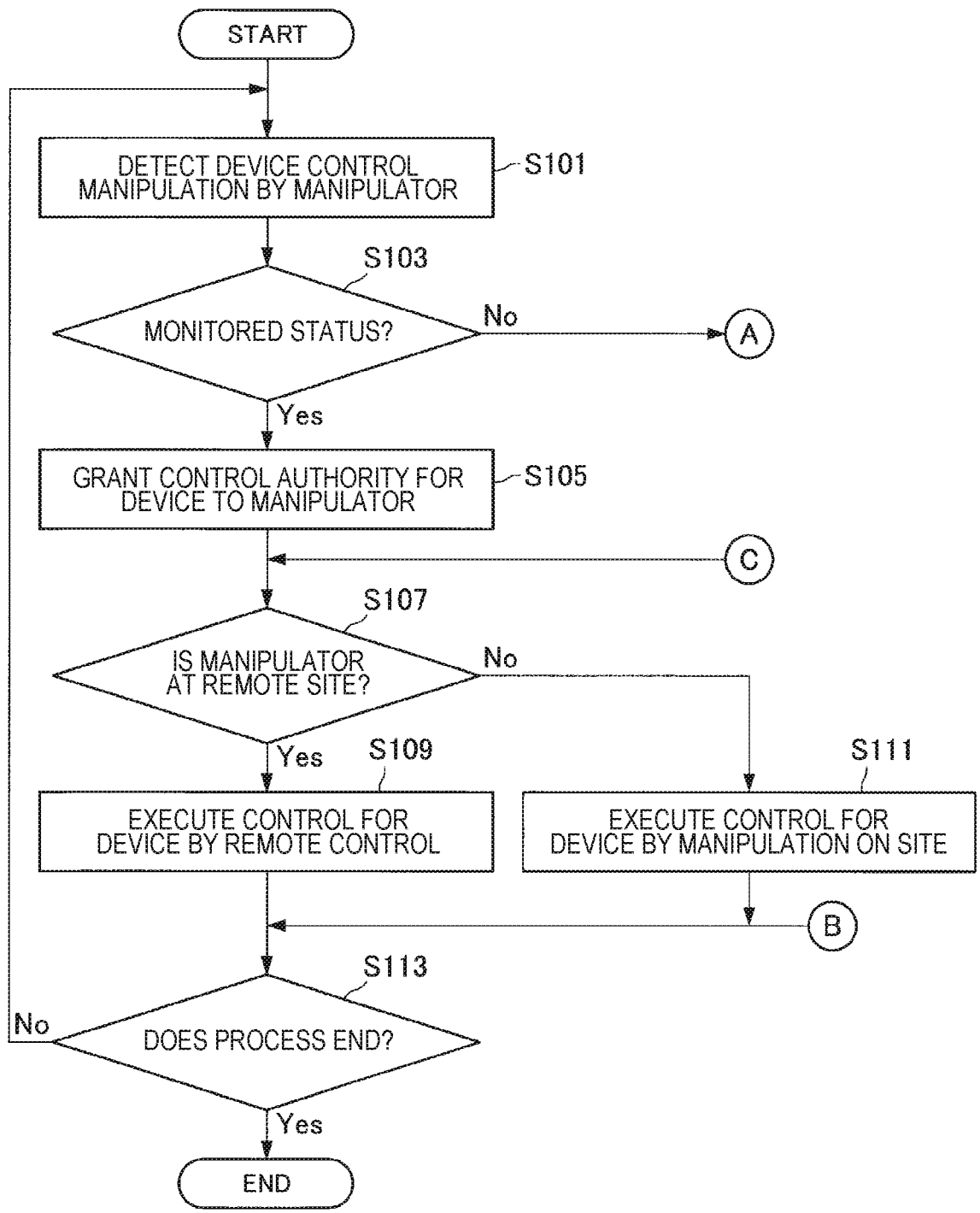
FIG. 7 is a flowchart illustrating a part of an operation example according to the first embodiment.

The configuration according to the first embodiment has been described above. Next, an example of an operation according to the first embodiment will be described with reference to FIGS. 7 and 8. FIG. 7 is a flowchart illustrating a part of the operation according to the first embodiment.

As illustrated in FIG. 7, various kinds of sensors in the space in which the device 30 is arranged or various kinds of sensors arranged at the remote site detect the status related to the manipulator 4, and transmit the detection results to the server 10. Alternatively, the user terminal 20 of the manipulator 4 detects a remote control input to the device 30, and then transmits a detection result to the server 10.

Thereafter, the device manipulation determining unit 102 of the server 10 specifies the device 30 of the manipulation target and the start of the manipulation on the device 30 on the basis of the received detection result (S101).

Then, the monitored status determining unit 104 determines whether or not the device 30 of the manipulation target is in the monitored status (S103). In a case in which the status is determined to be the monitored status (Yes in S103), the control authority managing unit 106 grants the control authority for the device 30 of the manipulation target to the manipulator 4 (S105).

Then, the device control unit 112 determines whether or not the manipulator 4 is located at the remote site on the basis of the detection result received in S101 (S107). In a case in which the manipulator 4 is determined to be located at the remote site (Yes in S107), the device control unit 112 controls the device 30 on the basis of manipulation information detected at the remote site (S109). Then, the server 10 performs a process of S113 to be described later.

On the other hand, in a case in which the manipulator 4 is determined not to be located at the remote site (that is, in a case in which the manipulator 4 is determined to be located in the space in which the device 30 is located) (No in S107), the device control unit 112 controls the device 30 on the basis of the manipulation detected in the space (S111).

Then, the server 10 determines whether or not an end of the manipulation on the device 30 is input (S113). In a case in which the end is input (Yes in S113), the server 10 ends the present operation. On the other hand, in a case in which no end is input (No in S113), the server 10 performs the process of S101 again.

Figure 8:
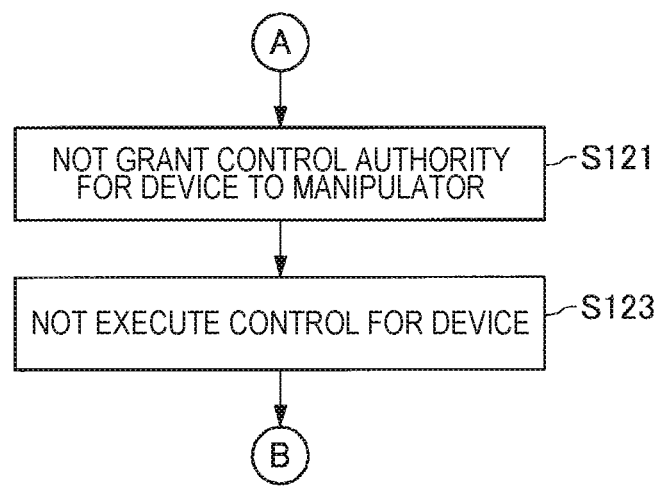
FIG. 8 is a flowchart illustrating a part of an operation example according to the first embodiment.

Here, the operation in a case in which the status is determined not to be the monitored status in S103 (No in S103) will be described with reference to FIG. 8. As illustrated in FIG. 8, first, the control authority managing unit 106 decides not to grant the control authority for the device 30 of the manipulation target to the manipulator 4 (S121). Then, the control of the manipulator 4 for device 30 of the manipulation target is not permitted (S123). Further, at this time, the output control unit 108 can cause a display indicating that the control authority is not granted to be displayed on the user terminal 20 of the manipulator 4.

Thereafter, the server 10 performs the process of S113 described above.

1-3-1. First Modified Example

Further, the operation according to the first embodiment is not limited to the above example. For example, as a first modified example, in a case in which the status is determined not to be the monitored status in S103 (No in S103), a control authority being narrower than in a case in which the status is the monitored status may be granted to the manipulator 4. Specifically, instead of the operation of S121 to S123 illustrated in FIG. 8, an operation (S131 to S137) illustrated in FIG. 9 may be executed.

Figure 9:
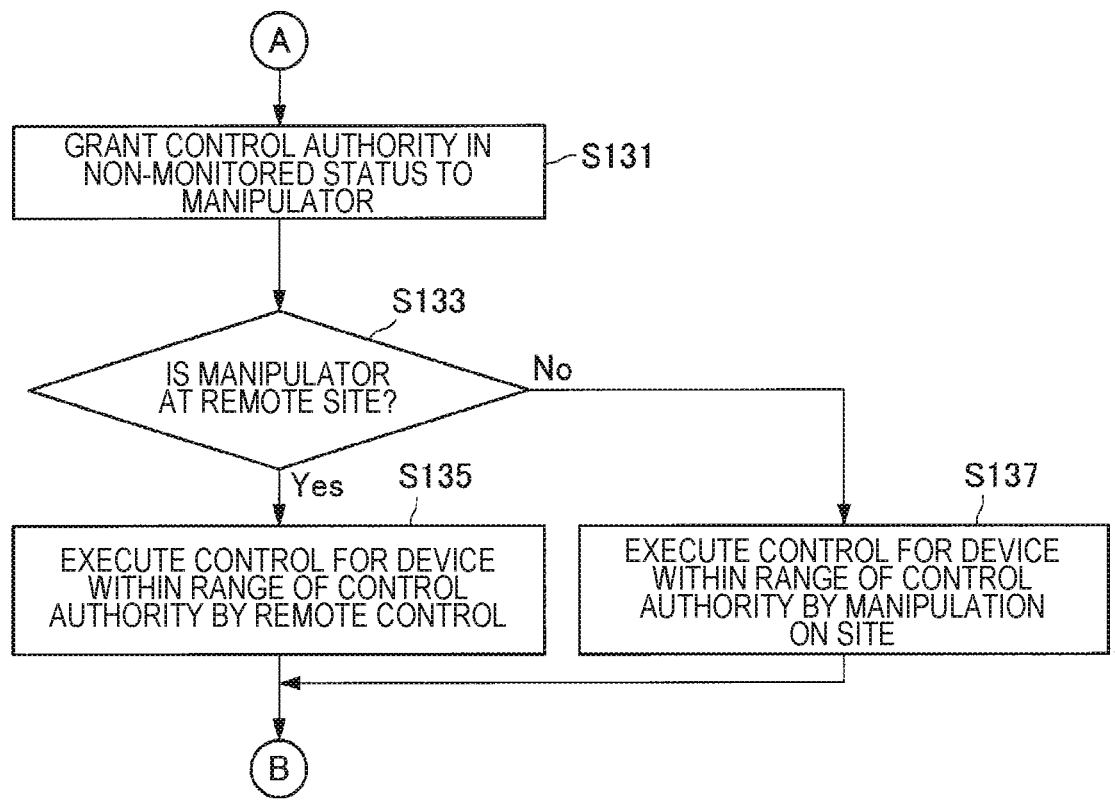
FIG. 9 is a flowchart illustrating a part of an operation according to a modified example of the first embodiment.

Here, an operation according to the first modified example will be described with reference to FIG. 9. In the first modified example, in a case in which the status is determined not to be the monitored status in S103 (No in S103), the control authority managing unit 106 first grants the control authority to the manipulator 4 in a case in which the status is not the monitored status (S131).

Then, the device control unit 112 determines whether or not the manipulator 4 is located at the remote site on the basis of the detection result received in S101 (S133). In a case in which the manipulator 4 is determined to be located at the remote site (Yes in S133), the device control unit 112 controls the device 30 of the manipulation target within the range of the control authority granted in S131 on the basis of the manipulation information detected at the remote site (S135). Then, the server 10 performs the process of S113 described above.

On the other hand, in a case in which the manipulator 4 is determined not to be located at the remote site (that is, in a case in which the manipulator 4 is determined to be located in the space in which the device 30 is arranged) (No in S133), the device control unit 112 controls the device 30 within the range of the control authority granted in S131 on the basis of the manipulation detected in the space (S137). Then, the server 10 performs the process of S113 described above.

1-3-2. Second Modified Example

Further, as a second modified example, in a case in which the status is determined not to be the monitored status in S103 (No in S103), on the basis of the manipulation on the user terminal 20 by the manipulator 4, a notification of the request for granting the control authority for the device 30 of the manipulation target may be given to the authority holder 6, or a notification of the request for causing the authority holder 6 to monitor the device 30 may be given to the authority holder 6. Specifically, the operation (S151 to S179) illustrated in FIGS. 10 and 11 may be executed instead of the operation of S121 to S123 illustrated in FIG. 8.

Figure 10:
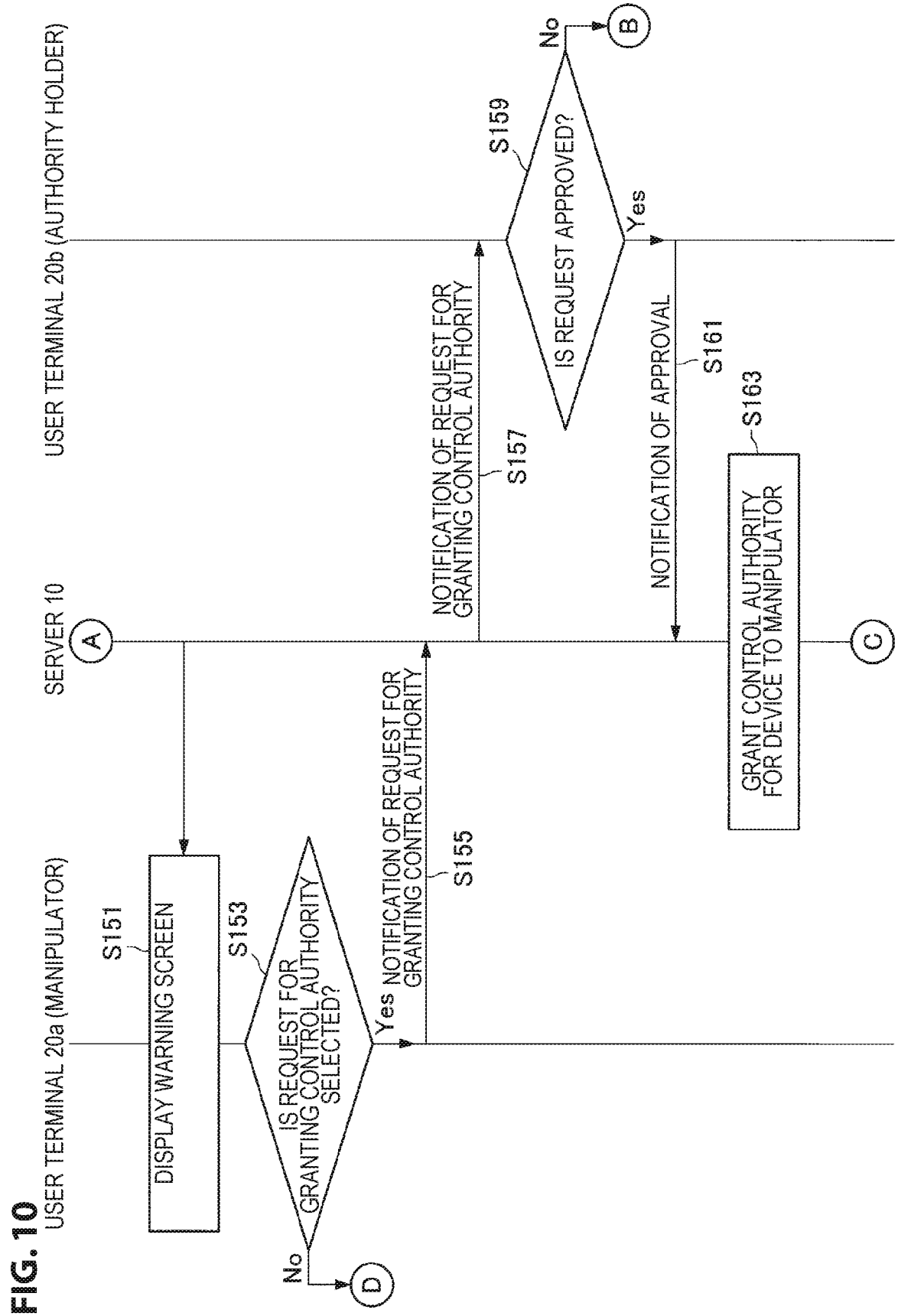
FIG. 10 is a sequence diagram illustrating a part of an operation according to another modified example of the first embodiment.

Here, the operation according to the second modified example will be described with reference to FIG. 10. In the second modified example, in a case in which the status is determined not to be the monitored status in S103 (No in S103), the output control unit 108 of the server 10 first causes the warning screen including the control authority grant request button and the notification button illustrated in, for example, FIG. 6 to be displayed on a user terminal 20a of the manipulator 4 (S151).

Thereafter, the user terminal 20a determines whether or not the control authority grant request button is selected by the manipulator 4 in the warning screen (S153). In a case in which the control authority grant request button is selected (Yes in S153), the user terminal 20a gives a notification indicating that the control authority grant request button is selected to the server 10 (S155).

Thereafter, in accordance with the control of the notifying unit 110, the communication unit 120 of the server 10 transmits the request for granting the control authority for the device 30 to a user terminal 20b of the authority holder 6 (S157).

Thereafter, the user terminal 20b displays the received request on the display screen. Then, in a case in which the authority holder 6 performs an input indicating that the request is not approved to the user terminal 20b (No in S159), the server 10 performs the process of S113 described above.

On the other hand, in a case in which the authority holder 6 performs an input indicating that the request is approved to the user terminal 20b (Yes in S159), the user terminal 20b gives a notification indicating the approval to the server 10 (S161).

Thereafter, the control authority managing unit 106 of the server 10 grants the control authority for the device 30 of the manipulation target to the manipulator 4 (S163). Thereafter, the server 10 performs the process of S107 described above.

Figure 11:
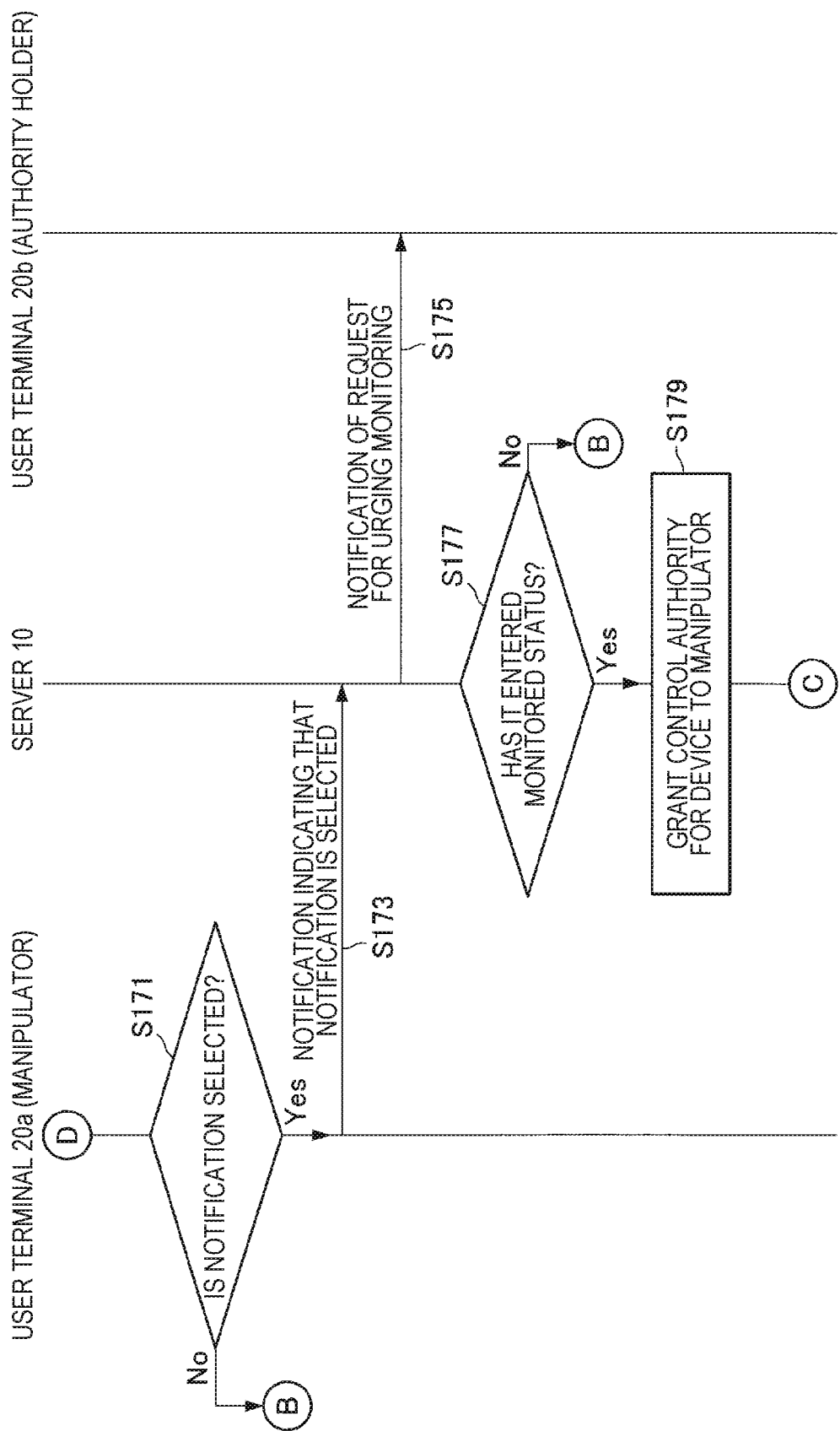
FIG. 11 is a sequence diagram illustrating a part of an operation according to another modified example of the first embodiment.

Here, an operation in a case in which the control authority grant request button is not selected in S153 (No in S153) will be described with reference to FIG. 11. As illustrated in FIG. 11, the user terminal 20a further determines whether or not the notification button is selected by the manipulator 4 in the warning screen (S171). In a case in which the notification button is not selected (No in S171), the server 10 performs the process of S113 described above.

On the other hand, in a case in which the notification button is selected (Yes in S171), the user terminal 20a gives a notification indicating that the notification button is selected to the server 10 (S173).

Thereafter, in accordance with the control of the notifying unit 110, the communication unit 120 of the server 10 transmits a notification for causing the authority holder 6 to monitor the device 30 to the user terminal 20b of the authority holder 6 (S175).

Thereafter, the monitored status determining unit 104 of the server 10 determines whether or not it enters the monitored status within a predetermined period of time from a timing of S175 (S177). In a case in which it is determined to enter the monitored status within the predetermined period of time (Yes in S177), the control authority managing unit 106 grants the control authority for the device 30 of the manipulation target to the manipulator 4 (S179). Thereafter, the server 10 performs the process of S107 described above.

On the other hand, in a case in which a predetermined period of time is determined to elapse without entering the monitored status (No in S177), the server 10 performs the process of S113 described above.

1-4. Effects

As described above, according to the first embodiment, the server 10 changes the control authority of the manipulator 4 for the device 30 of the manipulation target on the basis of whether or not the status is the monitored status. Therefore, it is possible to appropriately restrict the control over the device 30 by the manipulator 4.

For example, server 10 grants the control authority for the device 30 of the manipulation target to the manipulator 4 in a case in which the status is the monitored status, and does not grant the control authority for the device 30 of the manipulation target to the manipulator 4 in a case in which the status is not the monitored status. Therefore, it is possible to prevent control undesired by the authority holder 6 such as unauthorized control on the device 30 from being performed.

Further, according to the first embodiment, in a case in which the manipulator 4 manipulates the device 30 in the room 2 or in a case in which the manipulator 4 manipulates the device 30 at the remote site, the authority holder 6 can reliably monitor the manipulation state of the device 30. Therefore, the authority holder 6 can ask the manipulator 4 to control the device 30 with an easy min.

2. SECOND EMBODIMENT

2-1. Overview

The first embodiment has been described above. As described above, in the first embodiment, the manipulation of the device 30 by the manipulator 4 and the monitoring by the authority holder 6 are performed independently. Next, a second embodiment will be described.

Figure 12:
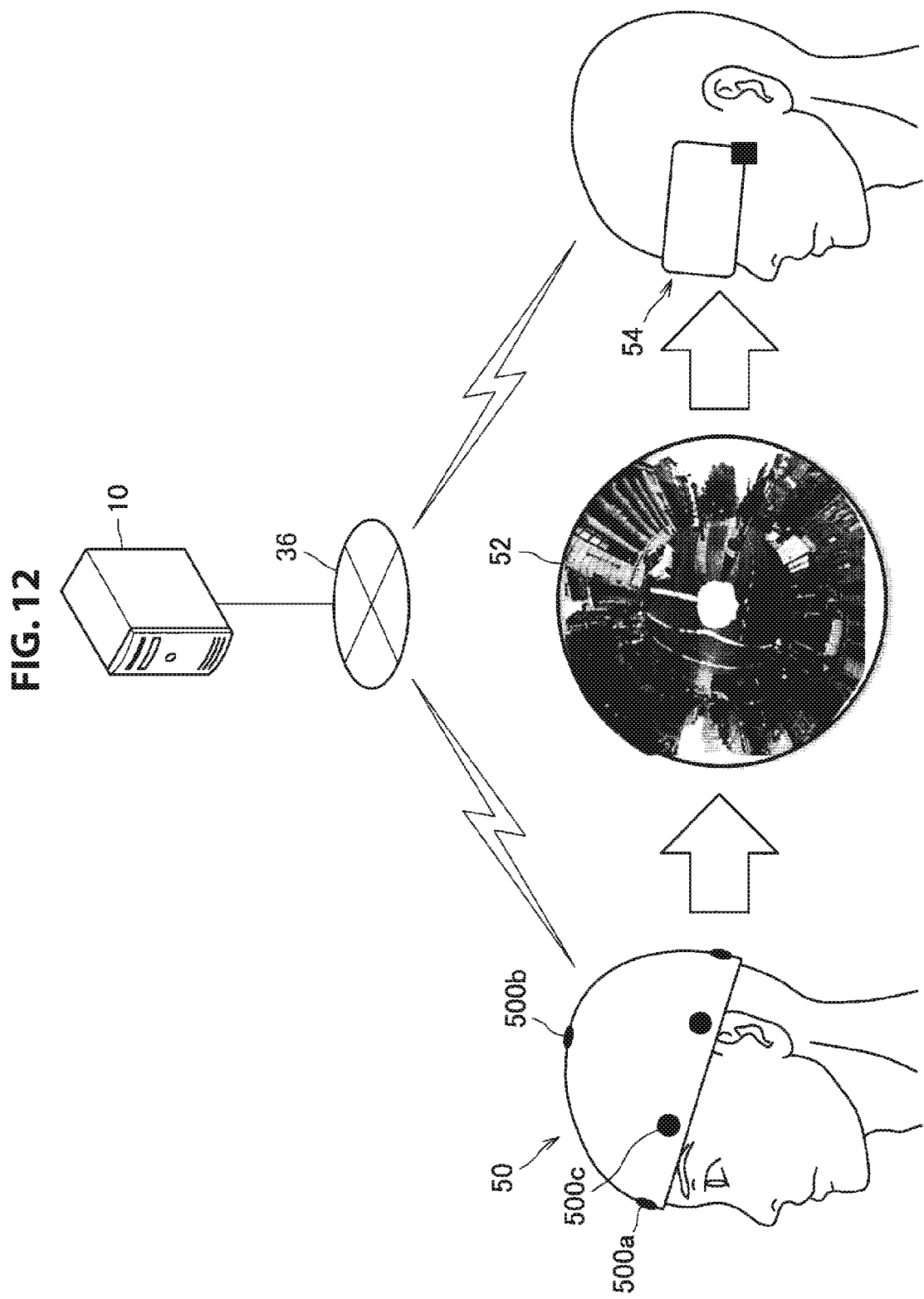
FIG. 12 is an explanatory diagram illustrating a configuration example of an information processing system according to a second embodiment.

First, an overview of the second embodiment will be described with reference to FIG. 12. FIG. 12 is an explanatory diagram illustrating a configuration of an information processing system according to the second embodiment. As illustrated in FIG. 12, in the second embodiment, a situation in which a first person (one of the authority holder 6 and the manipulator 4) wears a wearable camera 50 on the head, and the first person is located in a space in which the device 30 is arranged is assumed. Then, the server 10 transmits a video 52 (for example, a spherical video 52 or the like) based on photographing by the wearable camera 50 to a display unit 54 viewed by a second person (the other of the authority holder 6 and the manipulator 4) located at the remote site. Accordingly, the second person can obtain a feeling of being in the first person by viewing the transmitted video 52.

Here, as illustrated in FIG. 12, the wearable camera 50 may include a plurality of cameras 500 or a fisheye camera. Further, FIG. 12 illustrates an example in which the display unit 54 is a wearable device such as an HMD, but the present disclosure is not limited to such an example. For example, the display unit 54 may be a projector, and the display unit 54 may project the transmitted video 52 onto the screen. Further, the following description will proceed with an example in which the display unit 54 is a wearable device.

Further, as a specific method of implementing transmission of the video between the first person and the second person, for example, a technique described in WO 2015/122108 can be used.

As will be described later, the server 10 according to the second embodiment determines whether or not the status is the monitored status on the basis of a viewing status in which the manipulator 4 or the authority holder 6 views the video generated on the basis of the photographing of the device 30 of the manipulation target by the wearable camera 50.

2-2. Configuration

Next, a configuration according to the second embodiment will be described in detail. Components included in the server 10 according to the second embodiment are similar to those in the first embodiment (illustrated in FIG. 4). The following description will proceed focusing on components having functions different from those of the first embodiment.

2-2-1. Output Control Unit 108

The output control unit 108 according to the second embodiment generates a video of a point of view of the wearable camera 50 (first person point of view) (for example, the spherical video 52) on the basis of the image captured by the wearable camera 50. For example, the output control unit 108 generates the video of the point of view of the wearable camera 50 on the basis of the image captured by the wearable camera 50 by using the technique described in WO 2015/122108.

Further, the output control unit 108 causes the generated video to be displayed on the display unit 54.

2-2-2. Monitored Status Determining Unit 104

The monitored status determining unit 104 according to the second embodiment determines whether or not the status is the monitored status on the basis of the viewing status in which the manipulator 4 or authority holder 6 views the video (the video of the point of view of the wearable camera 50) generated on the basis of the photoaging of the device 30 of manipulation target by the wearable camera 50) (or the transmission status of the video). For example, in a case in which one of the manipulator 4 and the authority holder 6 is viewing the video of the point of view of the wearable camera 50 worn by the other of the manipulator 4 and the authority holder 6, the monitored status determining unit 104 determines that the status is the monitored status. Further, in a case in which one of the manipulator 4 and the authority holder 6 is not viewing the video of the point of view of the wearable camera 50, the monitored status determining unit 104 determines that the status is not the monitored status.

2-2-2-1. First Determination Example

Figure 13:
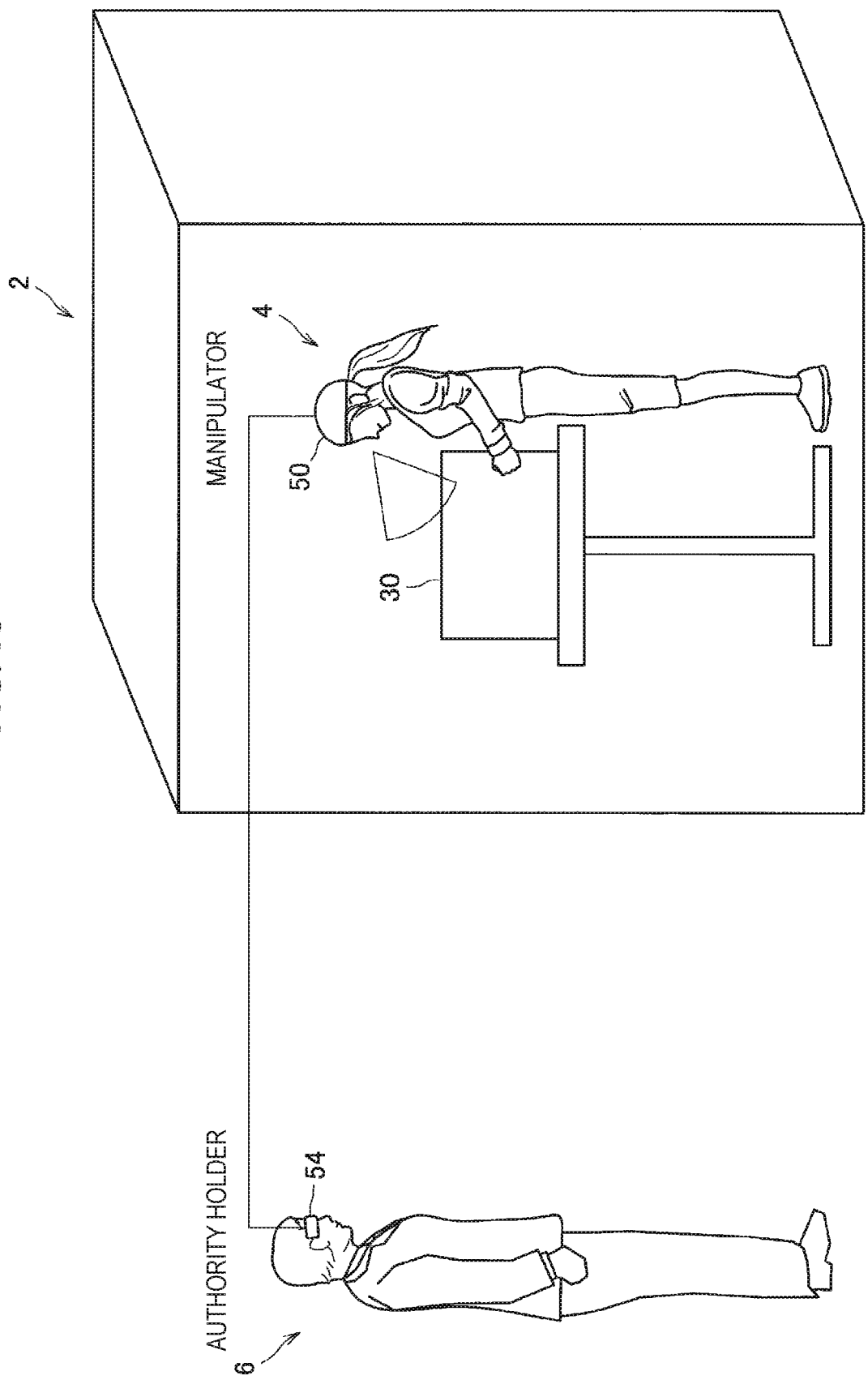
FIG. 13 is an explanatory diagram illustrating an example of a situation in which an authority holder 6 views a video of a point of view of a wearable camera 50.

FIG. 13 is an explanatory diagram illustrating an example of a situation in which the authority holder 6 is viewing the video of the point of view of the wearable camera 50. Specifically, as illustrated in FIG. 13, the manipulator 4 is wearing the wearable camera 50, and the manipulator 4 is located in the space in which the device 30 of the manipulation target is arranged. Further, a manipulation state related to the device 30 of the manipulation target is photographed by the wearable camera 50. Further, the video of the point of view of the wearable camera 50 is transmitted to the display unit 54 viewed by the authority holder 6 and displayed. According to this display example, the authority holder 6 can have a feeling of being in the manipulator 4 by viewing the video of the point of view of the wearable camera 50 even at the remote site.

In the example illustrated in FIG. 13, the monitored status determining unit 104 may further determine whether or not the status is the monitored status on the basis of a photographing result by a in-camera installed in the display unit 54. For example, in a case in which the face of the authority holder 6 is photographed by the in-camera, the monitored status determining unit 104 determines that the status is the monitored status. Further, in a case in which the face of the authority holder 6 is not photographed by the in-camera, the monitored status determining unit 104 determines that the status is not the monitored status. According to this determination example, it is possible to more accurately determine whether or not the device 30 of the manipulation target is under the supervision of the authority holder 6.

2-2-2-2. Second Determination Example

Figure 14:
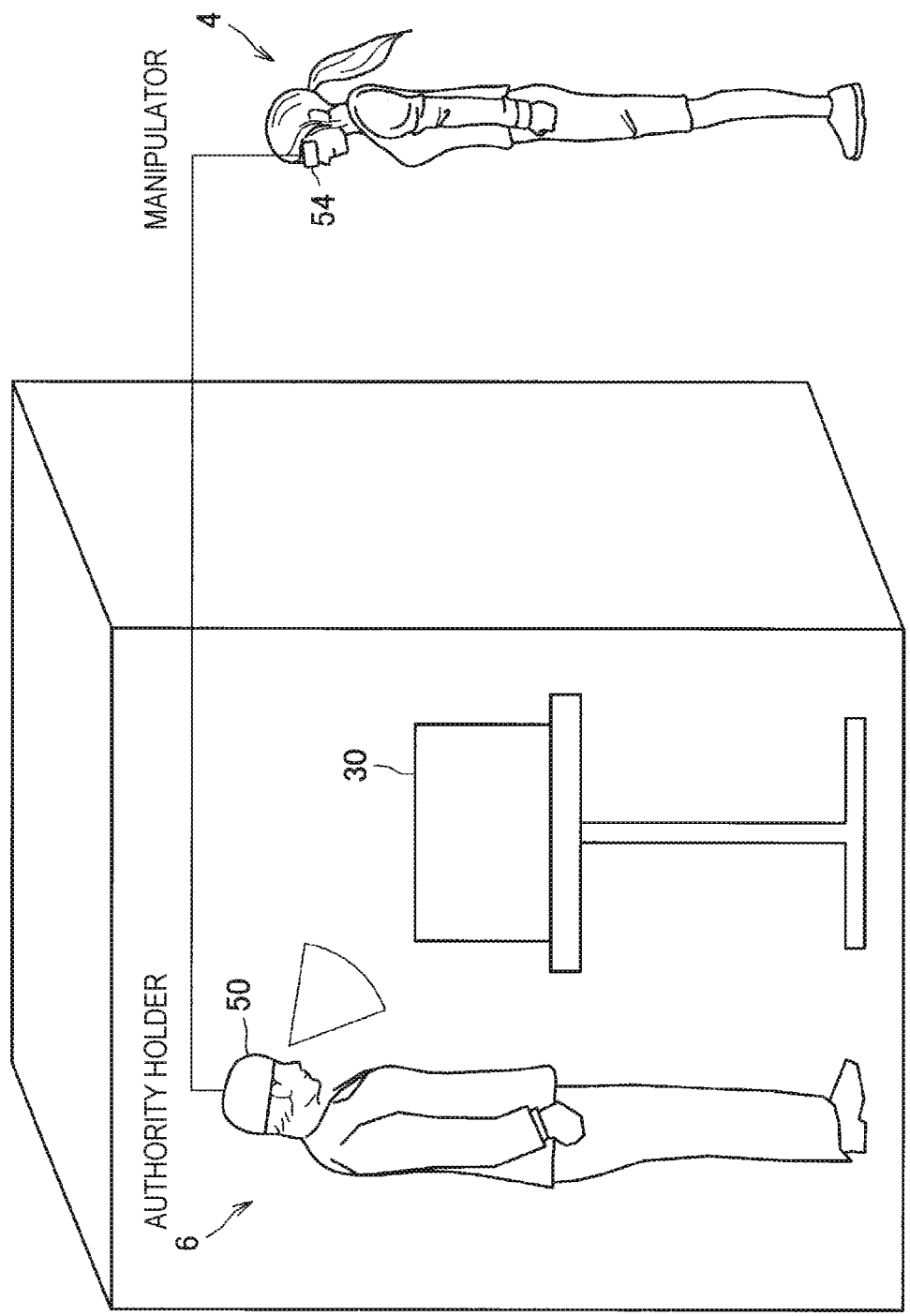
FIG. 14 is an explanatory diagram illustrating an example of a situation in which a manipulator 4 views a video of a point of view of a wearable camera 50.

Further, FIG. 14 is an explanatory diagram illustrating an example of a situation in which the manipulator 4 is viewing the video of the point of view of the wearable camera 50. Specifically, as illustrated in FIG. 14, the authority holder 6 is wearing the wearable camera 50, and the authority holder 6 is located in a space 2 in which the device 30 of the manipulation target is arranged. Further, the video of the point of view of the wearable camera 50 is transmitted to the display unit 54 viewed by the manipulator 4 and displayed. Further, the manipulator 4 attempts to manipulate the device 30 of the manipulation target at the remote site while viewing the video displayed on the display unit 54. According to this display example, the manipulator 4 can have a feeling of being in the authority holder 6 by viewing the video of the point of view of the wearable camera 50 even at remote site.

In the example illustrated in FIG. 14, the monitored status determining unit 104 may further determine whether or not the status is the monitored status on the basis of whether or not the device 30 of the manipulation target is located within a photographing range of the wearable camera 50. For example, in a case in which the device 30 of the manipulation target is located within the photographing range of the wearable camera 50, the monitored status determining unit 104 determines that the status is the monitored status. Further, in a case in which the device 30 of the manipulation target is not located within the photographing range of the wearable camera 50, the monitored status determining unit 104 determines that the status is not the monitored status. According to this determination example, it is possible to more accurately determine whether or not the device 30 of the manipulation target is under the supervision of the authority holder 6.

2-2-2-3. Modified Example

Further, in a case in which there are a plurality of authority holders 6, and the manipulator 4 is wearing the wearable camera 50, the monitored status determining unit 104 can determine whether or not the status is the monitored status on the basis of the viewing status in which one or more authority holders 6 having the management authority for the device 30 views the video generated on the basis of the photographing of the device 30 of the manipulation target by the wearable camera 50. For example, in a case in which at least one authority holder 6 having the management authority for the device 30 is viewing the video, the monitored status determining unit 104 may determine that the status is the monitored status. Further, in a case in which all the authority holders 6 having the manipulation authority for the device 30 are not viewing the video, the monitored status determining unit 104 may determine that the status is not the monitored status.

2-3. Effects

As described above, according to the second embodiment, it is determined whether or not the status is the monitored status on the basis of the viewing status in which the manipulator 4 or the authority holder 6 views the video generated on the basis of the photographing of the device 30 of the manipulation target by the wearable camera 50, and then the control authority for the device 30 by the manipulator 4 is changed on the basis of a determination result. Therefore, it is possible to appropriately restrict the control over the device 30 by the manipulator 4.

Further, according to the second embodiment, in a case in which the manipulator 4 is wearing the wearable camera 50, the authority holder 6 can have a feeling of being in the manipulator 4 by viewing the video of the point of view of the wearable camera 50 even at the remote site. For this reason, the authority holder 6 can check (monitor) the manipulation state of the device 30 by the manipulator 4 with a high realistic sensation at the remote site.

Further, in a case in which the authority holder 6 is wearing the wearable camera 50, the manipulator 4 can have a feeling of being in the authority holder 6 by viewing the video of the point of view of the wearable camera 50 even at the remote site. Thus, the manipulator 4 can have a realistic sensation of manipulating the device 30 directly in the space in which the device 30 of the manipulation target is arranged at the remote site.

3. THIRD EMBODIMENT

The second embodiment has been described above. Next, a third embodiment will be described. First, a background leading to the creation of the third embodiment will be described.

In a case in which the device 30 is manipulated at the remote site, a manipulation mistake is more likely to occur than in a case in which the device 30 is manipulated directly in the space in which device 30 is arranged. Accordingly, for example, a dangerous situation such as a fire is likely to occur.

As will be described later, according to the third embodiment, it is possible to set a type or a function of a controllable device 30 in advance at the remote site. Accordingly, it is possible to improve safety in a situation in which the device 30 is remotely controllable by the manipulator 4.

3-1. Configuration

An information processing system according to the third embodiment is similar to that of the first embodiment (illustrated in FIG. 1). Further, the components included in the server 10 according to the third embodiment are similar to those of the first embodiment (illustrated in FIG. 4). The following description will proceed focusing on components having functions different from those of the first embodiment.

3-1-1. Control Authority Managing Unit 106

3-1-1-1. Authority Grant Example

In a case in which the manipulator 4 is located at the remote site, the control authority managing unit 106 according to the third embodiment further changes the control authority of the manipulator 4 for the device 30 of the manipulation target on the basis of a registration state of a remote control target device list. Further, as will be described later, the target device 30 can be registered in the remote control target device list by a manual setting by the authority holder 6 or an automatic setting. Further, the remote control target device list is stored in, for example, the storage unit 122.

For example, in a case in which the manipulator 4 is located at the remote site and, the device 30 of the manipulation target is registered in the remote control target device list, the control authority managing unit 106 decides the control authority of the manipulator 4 on the basis of the function of the manipulation target and the registration state of the remote controllable function related to the device 30 in the remote control target device list. Further, in a case in which the manipulator 4 is located at the remote site, and device 30 of the manipulation target is not registered in the remote control target device list, the control authority managing unit 106 does not grant the control authority for the device 30 of the manipulation target to the manipulator 4.

Alternatively, only in a case in which the manipulator 4 is located at the remote site, and the status is determined not to be the monitored status, the control authority managing unit 106 determines whether or not the control authority for the device 30 of the manipulation target is granted to the manipulator 4 on the basis of the registration state of the remote control target device list. In other words, in a case in which the status is determined to be the monitored status, the control authority managing unit 106 may grant the control authority for the device 30 of the manipulation target to the manipulator 4 (regardless of the registration state of the remote control target device list).

3-1-1-2. Setting of Remote Controllable Device/Function

Manual Setting

Further, the target device 30 can be manually set in the remote control target device list, for example, by the authority holder 6 performing an input to the user terminal 20. For example, the type of the remote controllable device 30 is registered in the remote control target device list on the basis of the input of the authority holder 6 to the user terminal 20. Alternatively, the type of the remote controllable device 30 may be registered in the remote control target device list on the basis of a combination of detection of the line of sight of the authority holder 6 and voice recognition of a voice spoken by the authority holder 6.

Figure 15:
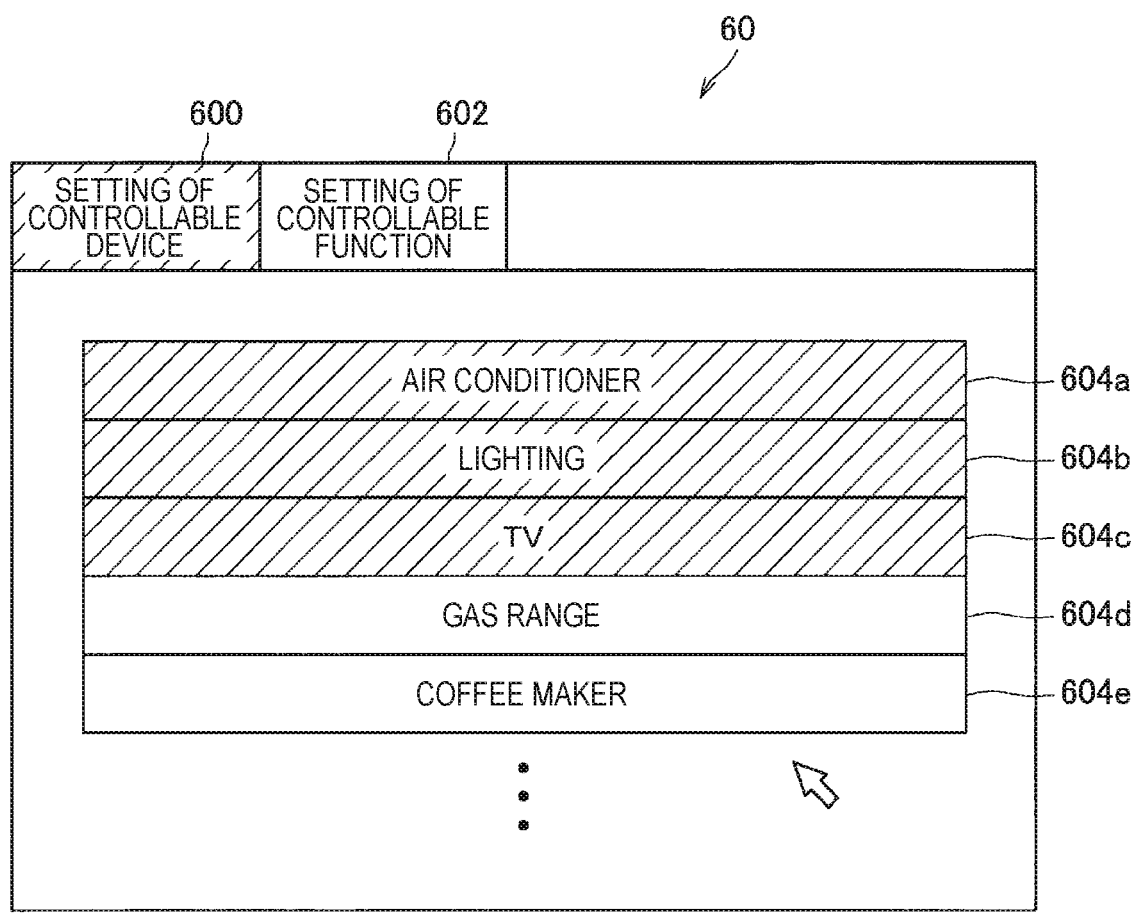
FIG. 15 is an explanatory diagram illustrating a display example of a device control setting screen according to a third embodiment.

For example, the authority holder 6 can set the type of the remote controllable device 30 and the type of the remote controllable function in a device control setting screen displayed on the user terminal 20. Here, a display example of the device control setting screen (a device control setting screen 60) will be described with reference to FIG. 15. As illustrated in FIG. 15, the device control setting screen 60 includes a device setting tab 600 and a function setting tab 602. Here, the device setting tab 600 is a tab for setting the type of the remote controllable device 30. Further, the function setting tab 602 is a tab for setting the type of the remote controllable function. Further, FIG. 15 illustrates a state in which the device setting tab 600 is selected. When the device setting tab 600 is selected, a plurality of device selection buttons 604 such as an air conditioner selection button 604a and a lighting selection button 604b are displayed on the device control setting screen 60 as illustrated in FIG. 15. Here, a device selection button 604 is a button for setting the corresponding device 30 as a remote controllable device. Further, FIG. 15 illustrates a state in which the air conditioner 30b, the lighting 30a, and the television receiver 30c are already been set as the remote controllable devices.

Further, the type of the remote controllable function can be set for each type of device 30. For example, in a case in which the device 30 is the air conditioner 30b, it is possible to set whether or not functions such as an On/Off input, a set temperature setting, a timer setting, cleaning, dehumidification control, heating control, cooling control, and blast control can be remotely controlled. Further, in a case in which the device 30 is a gas range, it is possible to set whether or not functions such as an On/Off input, a temperature setting, and a timer setting can be remotely controlled.

Automatic Setting

Alternatively, the type and the function type of the remote controllable device 30 can be automatically registered in the remote control target device list. For example, it is possible to set whether or not remote control can be performed in accordance with a distance from the space in which the device 30 is arranged. For example, in a case in which the distance to the space is very small (close), all the device 30 may be set as the remote controllable devices.

Alternatively, the type of the remote controllable device 30 can be set depending on the manipulator 4. For example, in a case in which the manipulator 4 is a child, all the device 30 may be set as uncontrollable devices.

Alternatively, it is possible to set whether or not the remote control can be performed depending on whether or not there is a person in the room 2. For example, in a case in which there is a person in the room 2, the device 30 may be set as the remote controllable device. Alternatively (conversely), a setting in which a specific function, for example, a function of turning "Off" can be controlled may be performed only in a case in which there is no person in the room 2. Further, a setting in which the remote control is unable to be performed in a case in which a person (for example, all) in the room 2 is detected to leave may be performed.

Alternatively, it can be registered whether or not the remote control can be performed in accordance with a status of the device 30 or control content for the device 30. For example, a setting in which it is possible to turning "Off" in a case in which device 30 of the manipulation target is in an "On" state may be performed. Alternatively, a setting in which it is possible to control the device 30 such that a status safer than a current status is achieved may be performed. For example, a setting in which it is possible to lower the set temperature in a case in which the device 30 is the air conditioner 30b may be performed. Further, a setting in which it is possible to lower the set temperature in a case in which the device 30 is a device using gas may be performed. Alternatively, a setting in which it is possible to control the device 30 in a case in which the status of the device 30 before manipulation is "On" may be performed. For example, a setting in which it is possible to change a channel in a case in which the device 30 is the television receiver 30c, and the status before manipulation is "On" may be performed. Further, a setting in which a function of turning "On" is unable to be performed in a case in which the status of the device 30 before manipulation is "Off" may be performed. Alternatively, a setting in which it is possible to temporarily performs a setting to "Off" in a case in which the status of the device 30 becomes dangerous, for example, in a case in which the temperature is increased greatly, or in a case in which the device 30 is in the "On" state for a long time may be performed.

Alternatively, a setting in which it is possible to perform the remote control in a case in which a remaining time until a scheduled home return time of a person who is out of the room 2 is equal to or less than a predetermined period of time may be performed.

3-2. Operation

The configuration according to the third embodiment has been described above. Next, an operation according to the third embodiment will be described in "3-2-1. Operation when controllable device/function is set" and "3-2-2. Operation when device 30 is manipulated."

3-2-1. Operation when Controllable Device/Function is Set

Figure 16:
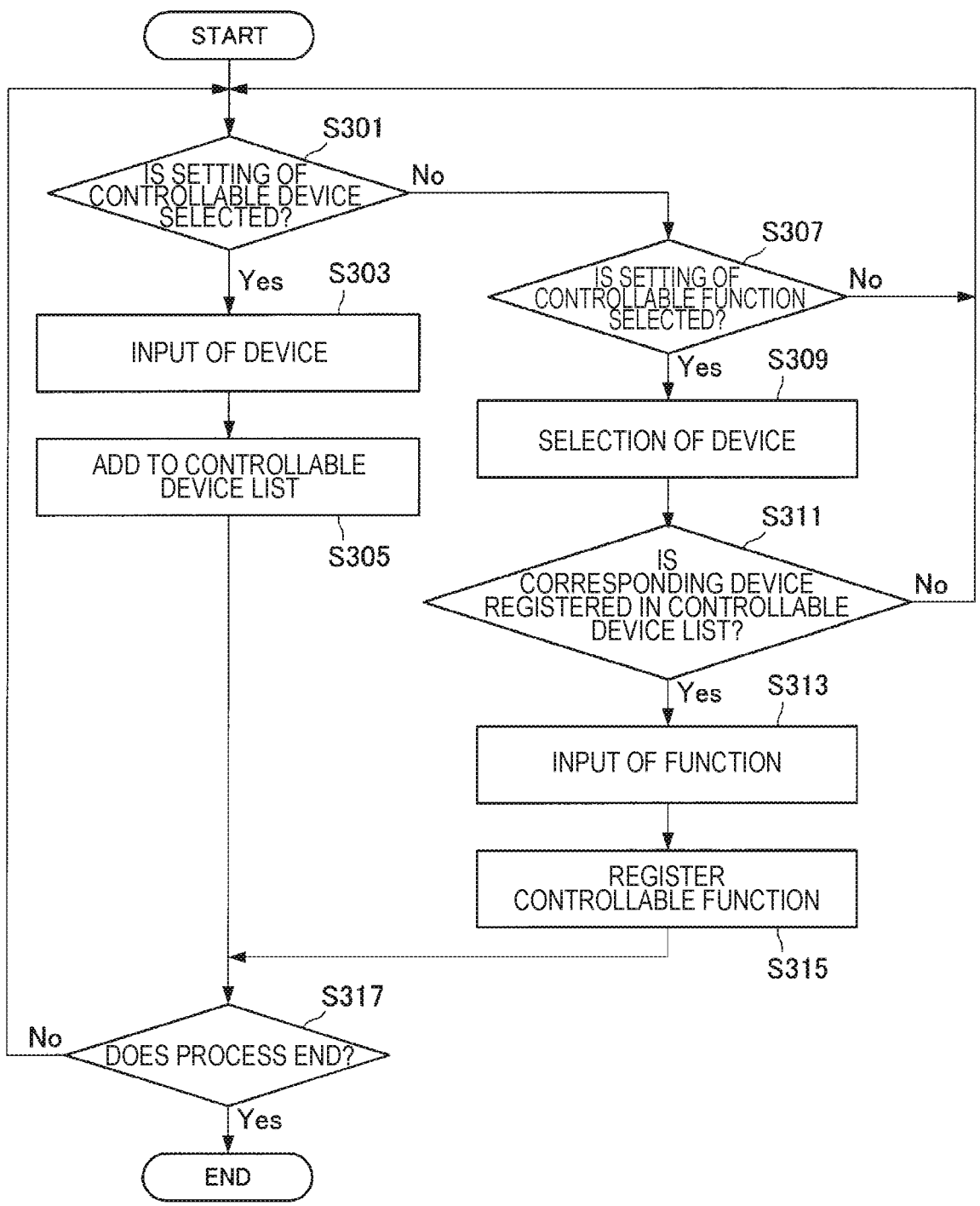
FIG. 16 is a flowchart illustrating an operation example when a controllable device/function is set according to the third embodiment.

FIG. 16 is a flowchart illustrating an "operation when the controllable device/function is set" according to the third embodiment. As illustrated in FIG. 16, first, the authority holder 6 manipulates the user terminal 20 and activates a device control setting application. Then, in a case in which the authority holder 6 selects the setting of the remote controllable device 30 (Yes in S301), the authority holder 6 then inputs the type of the remote controllable device 30 (S303).

Thereafter, the user terminal 20 transmits the input type of the device 30 to the server 10. Then, the server 10 adds the received type of the device 30 to the remote control target device list stored in the storage unit 122 (S305).

Further, in a case in which the authority holder 6 selects the setting of the remote controllable function (No in S301 and Yes in S307), the authority holder 6 then selects a target device (S309).

Then, in a case in which the selected device is not registered in the remote control target device list (No in S311), the user terminal 20 again performs the operation of S301.

On the other hand, in a case in which the selected device is registered in the remote control target device list (Yes in S311), the authority holder 6 then inputs the type of controllable function for the corresponding device (S313).

Thereafter, the user terminal 20 transmits the input type of the function to the server 10. Then, the server 10 registers the received function in the remote control target device list as the remote controllable function for the device 30 selected in S309 (S315).

Thereafter, the user terminal 20 determines whether or not an end of the device control setting application is input (S317). In a case in which the end is input (Yes in S317), the server 10 ends the present operation. On the other hand, in a case in which the end is not input (No in S317), the user terminal 20 performs the process of S301 again.

Further, in a case in which the setting of the remote controllable function is not selected in S307 (No in S307), the user terminal 20 again performs the operation of S301.

3-2-2. Operation when Device 30 is Manipulated

Figure 17:
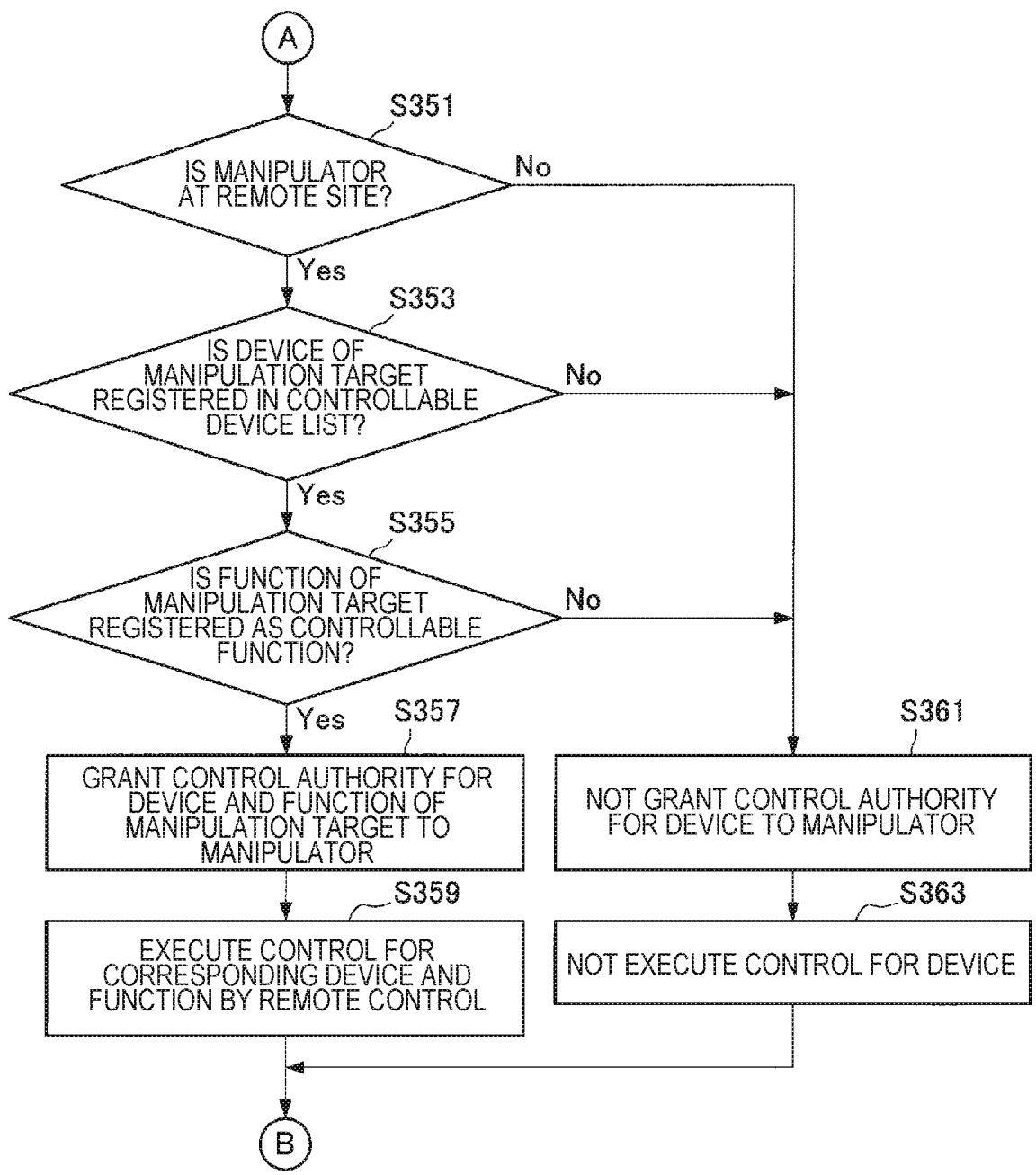
FIG. 17 is a flowchart illustrating a part of an operation example when a device is manipulated according to the third embodiment.

Next, an "operation when the device 30 is manipulated" according to the third embodiment will be described. Further, the present operation similarly includes the operation of S101 to S113 according to the first embodiment. Further, in the present operation, in a case in which the status is determined not to be the monitored status in S103 (No in S103), the control authority is granted to the manipulator 4 only when the device 30 of the manipulation target and the functions of the manipulation target are registered in the remote control target device list, Specifically, an operation (S351 to S363) illustrated in FIG. 17 is executed instead of the operation of S121 to S123 according to the first embodiment (illustrated in FIG. 8).

Here, the "operation when the device 30 is manipulated" will be described with reference to FIG. 17. In a case in which the status is determined not to be the monitored status in S103 (No in S103), the control authority managing unit 106 first determines whether or not the manipulator 4 is located at the remote site on the basis of the detection result received in S101 (S351). In a case in which the manipulator 4 is determined not to be located at the remote site (that is, in a case in which the manipulator 4 is determined to be located in the space in which the device 30 of the manipulation target is arranged) (No in S351), the server 10 performs the process of S361 to be described later.

On the other hand, in a case in which the manipulator 4 is determined to be located at the remote site (Yes in S351), the control authority managing unit 106 determines whether or not the device 30 of the manipulation target is registered in the remote control target device list (S353). In a case in which the device 30 of the manipulation target is not registered in the remote control target device list (No in S353), the server 10 performs the process of S361 to be described later.

On the other hand, in a case in which the device 30 of the manipulation target is registered in the remote control target device list (Yes in S353), the control authority managing unit 106 then determines whether or not the function of the manipulation target of the device 30 is registered in the remote control target device list as the controllable function (S355). In a case in which the function of the manipulation target of the device 30 is not registered in the remote control target device list (No in S355), the server 10 performs the process of S361 to be described later.

On the other hand, in a case in which the function of the manipulation target of the device 30 is registered in the remote control target device list (Yes in S355), the control authority managing unit 106 grants the control authority for the device 30 of the manipulation target and the function of the manipulation target to the manipulator 4 (S357).

Then, the device control unit 112 controls the function of the manipulation target on the device 30 on the basis of the manipulation information detected at the remote site (S359). Then, the server 10 performs the process of S113 (illustrated in FIG. 7).

Further, in a case in which the condition of S351, the condition of S353, or the condition of S355 is not satisfied, the control authority managing unit 106 does not grant the control authority for the device 30 of the manipulation target to the manipulator 4 (S361). Then, the control by the manipulator 4 for the device 30 of the manipulation target is not permitted (S363). Further, at this time, the output control unit 108 can cause a display indicating that the control authority is not granted to be displayed on the user terminal 20 of the manipulator 4.

Thereafter, the server 10 performs the process of S113 (illustrated in FIG. 7).

3-3. Effects

As described above, according to the third aspect, the authority holder 6 can set the type and the function of the device 30 controllable from the remote site in advance. Further, in a case in which the manipulator 4 is located at the remote site, the server 10 changes the control authority of the manipulator 4 for the device 30 of the manipulation target on the basis of whether or not the status is the monitored status and the registration state of the remote control target device list.

Therefore, by setting a specific device 30 such as the device 30 having a high risk and a function as being uncontrollable from the remote site, it is possible to cause the device to be unable to be remotely controlled by the manipulator 4 in a case in which the status is not the monitored status. Therefore, it is possible to improve safety in a situation in which the device 30 is able to be remotely controlled by the manipulator 4.

4. FOURTH EMBODIMENT

4-1. Overview

Figure 18:
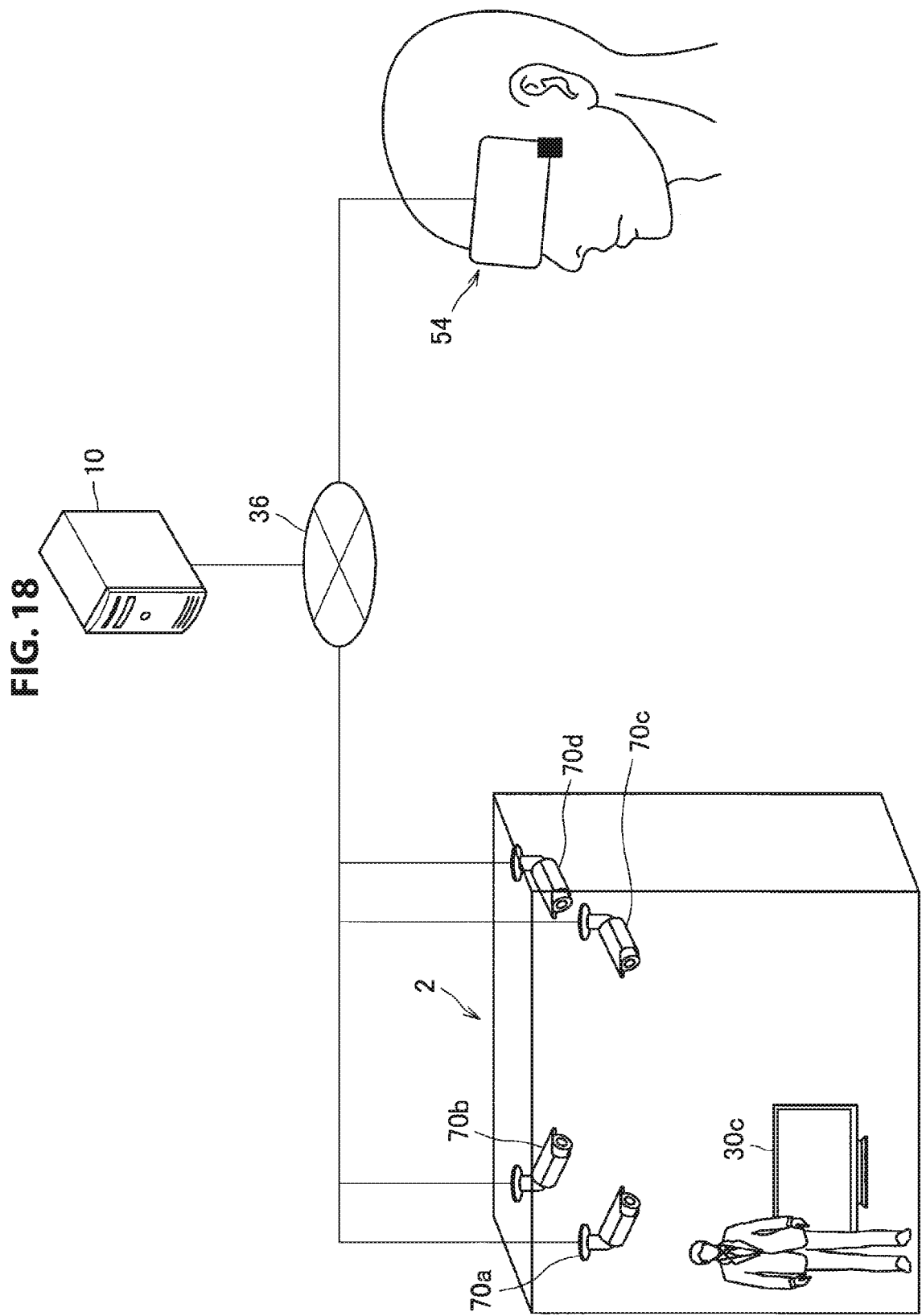
FIG. 18 is an explanatory diagram illustrating a configuration example of an information processing system according to a fourth embodiment.

The third embodiment has been described above. Next, a fourth embodiment will be described. First, an overview of the fourth embodiment will be described with reference to FIG. 18. FIG. 18 is an explanatory diagram illustrating a configuration of an information processing system according to the fourth embodiment. As illustrated in FIG. 18, in the fourth embodiment, a situation in which a plurality of cameras 70 are arranged in a space 2 such as a room in which the device 30 is arranged, and three-dimensional information of the entire space 2 is acquired through a plurality of cameras 70 is assumed. Then, the server 10 transmits content of the space 2 generated on the basis of the acquired three-dimensional information to a display unit 54 viewed by a user (the authority holder 6 or the manipulator 4) located at the remote site. Accordingly, the user at remote site can have a realistic sensation of being located in the space 2.

Here, the camera 70 is, for example, a depth camera or a stereo camera. Further, FIG. 18 illustrates an example in which the display unit 54 is a wearable device such as an HMD or an AR glass, but the present disclosure is not limited to such an example. For example, the display unit 54 may be a television receiver 30c or a 3D television receiver. Alternatively, the display unit 54 may be a 3D projector, and a video may be projected onto the screen through the 3D projector. Further, the following description will proceed with an example in which the display unit 54 is a wearable device.

As will be described later, according to the fourth embodiment, it is possible to cause the content generated on the basis of the three-dimensional information of the space 2 acquired through the plurality of cameras 70 to be viewed by the authority holder 6 located at the remote site. Accordingly, the authority holder 6 can check (monitor) the manipulation state of the device 30 by the manipulator 4 with a high realistic sensation.

4-2. Configuration

Next, a configuration according to the fourth embodiment will be described in detail. Components included in the server 10 according to the fourth embodiment are similar to those of the first embodiment (illustrated in FIG. 4). The following will proceed focusing on components having functions different from those of the first embodiment.

4-2-1. Output Control Unit 108

4-2-1-1. First Control Example

The output control unit 108 according to the fourth embodiment generates content of the space 2 on the basis of the three-dimensional information of the entire space 2 acquired through a plurality of cameras 70. Then, the output control unit 108 causes the generated content to be displayed on the display unit 54.

4-2-1-2. Second Control Example

Further, as illustrated in FIG. 19, for example, the output control unit 108 can cause the video 72 of the second person located at the remote site to be displayed on the display unit viewed by the first person located in the space 2. Here, the display unit may be a wearable device such as an HMD or an AR glass worn by the first person. Alternatively, the display unit is a projector arranged in the space 2, and the display unit may project the video 72 of the second person into the space 2. Further, the following description will proceed with an example in which the display unit is a wearable device.

According to this display example, the first person (for example, the authority holder 6) can check that the second person (for example, the manipulator 4) located at the remote site is viewing the video of the space 2. For example, in a situation in which the first person and the second person communicate using a telephone, an e-mail, or the like, the first person can understand an area viewed by the second person in the space 2. Therefore, even in a case in which an object such as the device 30 located in the space 2 is taken as a topic, it is possible to prevent the occurrence of discrepancy in recognition between the two persons and to communicate smoothly.

4-2-1-3. Third Control Example

Further, in a case in which the authority holder 6 is located in the space 2, the manipulator 4 is located at the remote site, and the control authority for the device 30 of the manipulation target is not granted to the manipulator 4, the output control unit 108 may cause a virtual display indicating that the device 30 is virtually controlled and information indicating that the displayed space is a virtual space to be displayed on the display unit 54 (viewed by the manipulator 4). Further, in this case, the output control unit 108 may cause a display indicating that the device 30 is virtually controlled at the remote site to be displayed on the display unit (viewed by the authority holder 6)

Accordingly, the authority holder 6 can understand that the device 30 is virtually controlled at the remote site.

Alternatively, in this case, the output control unit 108 can cause a display indicating that the device 30 is uncontrollable in the virtual space to be displayed on the display unit 54 (viewed by the manipulator 4). For example, the output control unit 108 may cause the device 30 to be displayed blurred or cause the device 30 to be displayed punched out in content being displayed. Alternatively, in a case in which it is detected that the manipulator 4 starts to manipulate the device 30, the output control unit 108 may cause the device 30 to be displayed flicked in content being displayed. Alternatively, the output control unit 108 may cause an UI (for example, an icon) for manipulation of the device 30 not to be displayed in content being displayed. Alternatively, in a case in which the UI for manipulation (for example, an UI of an arm or a cursor) is displayed, and the UI for manipulation is moved to the vicinity of the display position of the device 30, the output control unit 108 may cause the UI for manipulation not to be displayed.

Alternatively, in a case in which the content being displayed is content in which the point of view is freely movable in the space, the output control unit 108 may control display of the content so that the point of view is unable to be closer to within a predetermined range from the device 30.

Alternatively, in a case in which the manipulator 4 is located at the remote site, and it is detected that the manipulator 4 starts to manipulate the device 30, the output control unit 108 may cause an alarm sound to be output at the remote site. Further, in this case, the output control unit 108 may cause a display indicating that the device 30 is uncontrollable to be simultaneously displayed on the display unit (viewed by the authority holder 6). For example, the output control unit 108 causes a predetermined display such as a line to be further displayed on the display unit at a position between the device 30 and the video 72 of the manipulator displayed on the display unit (viewed by the authority holder 6).

4-2-1-3. Third Control Example

Further, in a case in which the type of the device 30 is a device (such as a stereo) that outputs a sound, the control authority for the device 30 is granted to the manipulator 4, and the manipulator 4 is located at the remote site, the output control unit 108 can transmit recording data of the sound being output from the device 30 to an output apparatus (not illustrated) at the remote site at which the manipulator 4 is located on the basis of control by the manipulator 4 so that the sound is output at the remote site. Accordingly, for example, in a case in which music is being reproduced in the stereo in the space 2, the manipulator 4 at the remote site can listen to the music being reproduced.

Alternatively, in a case in which the type of the device 30 is a device that outputs a sound, the control authority for the device 30 is not granted to the manipulator 4, and the manipulator 4 is located at the remote site, the output control unit 108 may cause content of the space 2 to be displayed on the display unit 54 and cause the same sound as the sound that can be output from the device 30 to be output to the output apparatus located at the remote site. For example, in a case in which the manipulator 4 performs a manipulation of reproducing music on the stereo arranged in the space 2, the stereo does not reproduce the music, and the output apparatus located at the remote site reproduces the music. Accordingly, the music is not actually reproduced in the space 2, but it is possible to give the manipulator 4 a feeling of the music being reproduced in the space 2.

Alternatively, in the above case, the output control unit 108 can cause the sound that can be output from the device 30 not to be output to the output apparatus located at the remote site. In particular, in a case in which a type of content is premium content, and the right for the content is associated with the authority holder 6, for example, in a case in which the authority holder 6 has the right for the content, the output control unit 108 causes a sound of the content not to be output to the output apparatus at the remote site.

4-3. Effects

As described above, according to the fourth embodiment, the server 10 receives the three-dimensional information of the entire space 2 detected by a plurality of cameras 70, generates content of the space on the basis of the received three-dimensional information, and then transmits the generated content to the display unit 54 at the remote site. Accordingly, the user located at the remote site can have a realistic sensation of being located in the space 2. For example, in a case in which the authority holder 6 is located at the remote site, the authority holder 6 can check (monitor) the manipulation state of the device 30 by the manipulator 4 with a high realistic sensation. Further, in a case in which the manipulator 4 is located at the remote site, the manipulator 4 can remotely control the device 30 of the manipulation target while obtaining a realistic sensation of being located in the space 2.

5. FIFTH EMBODIMENT

5-1. Overview

Figure 20:
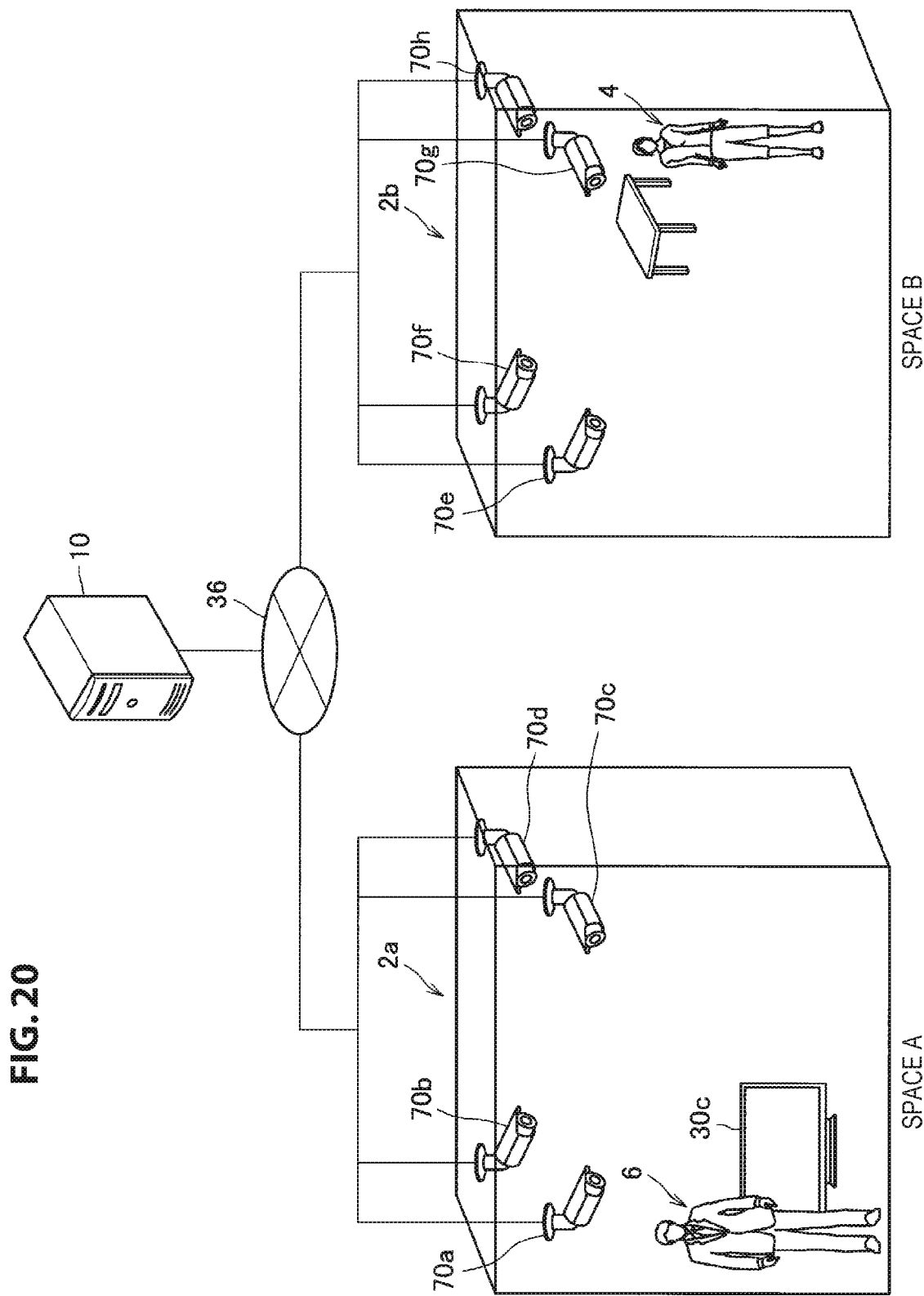
FIG. 20 is an explanatory diagram illustrating a configuration example of an information processing system according to a fifth embodiment.

The fourth embodiment has been described above. Next, a fifth embodiment will be described. First, an overview of the fifth embodiment will be described with reference to FIG. 20. FIG. 20 is an explanatory diagram illustrating a configuration of an information processing system according to the fifth embodiment. As illustrated in FIG. 20, in the fifth embodiment, a situation in which the authority holder 6 and the manipulator 4 are located in different spaces, and a plurality of cameras 70 are arranged in a space 2a in which the authority holder 6 is located and a space 2b in which the manipulator 4 is located.

Figure 21:
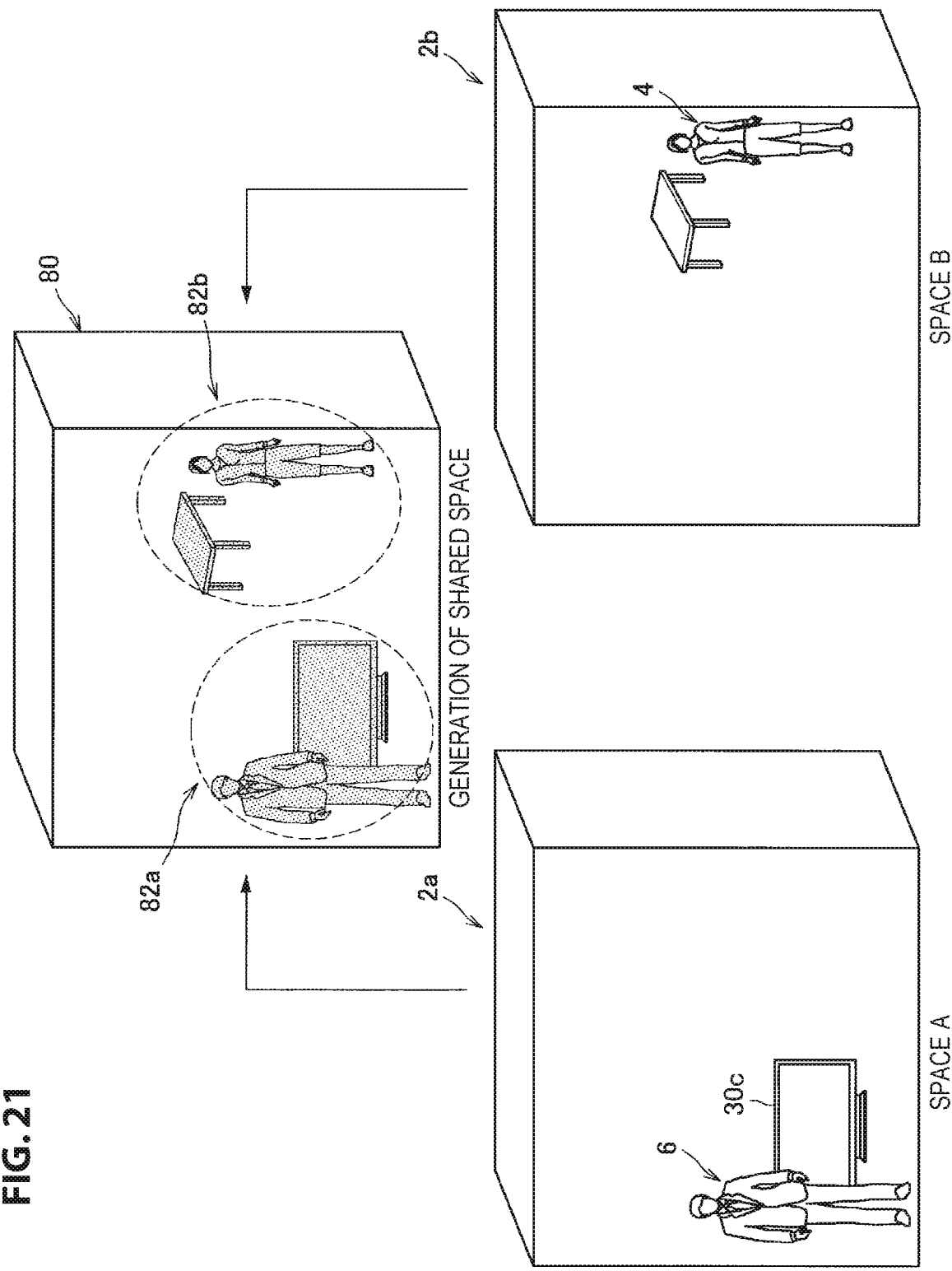
FIG. 21 is an explanatory diagram illustrating an example of generation of a shared space according to the fifth embodiment.

Then, as illustrated in FIG. 21, the server 10 generates a virtual shared space 80 by combining three-dimensional information of the entire space 2a acquired through a plurality of cameras 70 arranged in the space 2a and three-dimensional information of the entire space 2b acquired through a plurality of cameras 70 arranged in the space 2b. Further, the server 10 then transmits content of the generated shared space 80 to a display unit 54a viewed by the authority holder 6 and a display unit 54b viewed by the manipulator 4. Accordingly, the authority holder 6 and the manipulator 4 can have an experience of being located in the shared space 80 by viewing the transmitted content. Further, a configuration of the display unit 54 is similar to that of the fourth embodiment.

As will be described later, according to the fifth embodiment, it is possible to cause the authority holder 6 to view the content of the shared space generated on the basis of the three-dimensional information of the space 2a in which the authority holder 6 is located and the three-dimensional information of the space 2b in which the manipulator 4 is located. Accordingly, the authority holder 6 can check (monitor) the manipulation state of the manipulator 4 for the device 30 in real time with a high realistic sensation.

5-2. Configuration

Next, a configuration according to the fifth embodiment will be described in detail. Components included in the server 10 according to the fifth embodiment are similar to those in the fourth embodiment. The following description will proceed focusing on components having functions different from those of the fourth embodiment.

5-2-1. Output Control Unit 108

The output control unit 108 according to the fifth embodiment generates the virtual shared space by combining the three-dimensional information of the entire space 2a acquired through a plurality of cameras 70 arranged in the space 2a and the three-dimensional information of the entire space 2b acquired through a plurality of cameras 70 arranged in the space 2b. Then, the output control unit 108 can cause content corresponding to the generated shared space to be displayed on the display unit 54a (viewed by the authority holder 6) and the display unit 54b (viewed by the manipulator 4).

Figure 22:
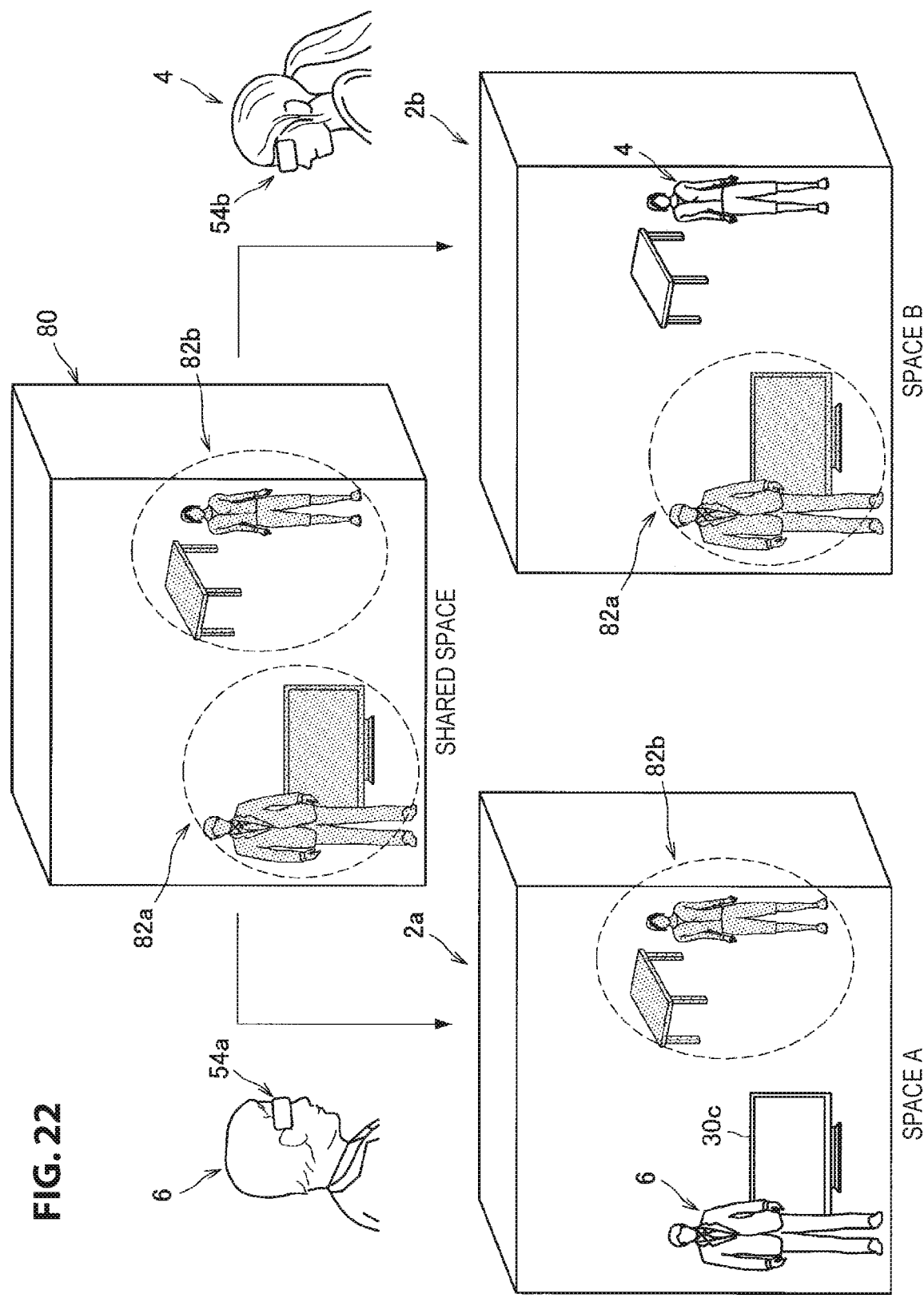
FIG. 22 is an explanatory diagram illustrating a display example of a video of a space 2a and a video of a space 2b generated on the basis of a generated shared space.

Alternatively, in a case in which the display unit 54a is a transmissive display, the output control unit 108 may cause only a video 82b of the space 2b in which the manipulator 4 is located to be displayed on the display unit 54a on the basis of the generated shared space as illustrated in FIG. 22. Further, in a case in which the display unit 54b is a transmissive display, the output control unit 108 may cause only a video 82a of the space 2a in which the authority holder 6 is located to be displayed on the display unit 54b on the basis of the generated shared space.

5-3. Effects

As described above, according to the fifth embodiment, the server 10 generates the virtual shared space by combining the three-dimensional information acquired in the space 2a in which the authority holder 6 is located and the three-dimensional information acquired in the space 2b in which the manipulator 4 is located, and causes the content of the generated shared space to be displayed on the display unit 54a (viewed by the authority holder 6) and the display unit 54b (viewed by the manipulator 4).

Accordingly, the authority holder 6 and the manipulator 4 can have an experience of being located in the shared space 80 by viewing the displayed content. For example, the authority holder 6 can check (monitor) the manipulation state of the manipulator 4 for the device 30 in a real time with a high realistic sensation.

Further, in a case in which the manipulator 4 is located in the space 2b different from the space 2a in which the device 30 of the manipulation target is arranged, the manipulator 4 can remotely control the device 30 with a realistic sensation of the device 30 being located in front of the manipulator 4.

6. HARDWARE CONFIGURATION

Figure 23:
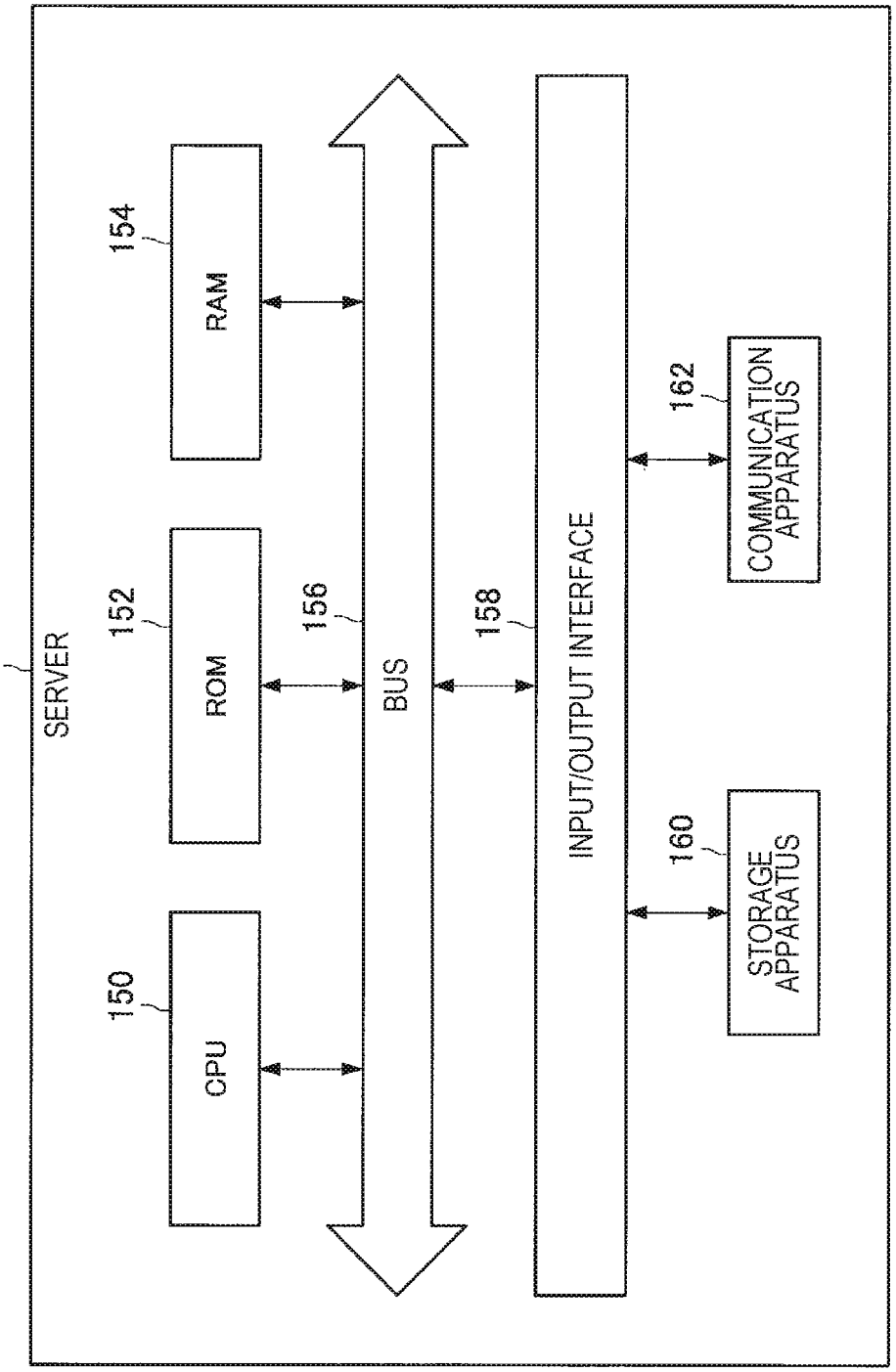
FIG. 23 is an explanatory diagram illustrating a hardware configuration example of a server 10 which is common to respective embodiments.

Next, a hardware configuration of the server 10 common in each of the present embodiment will be described next with reference to FIG. 23. As illustrated in FIG. 23, the server 10 include a CPU 150, a read only memory (ROM) 152, a RAM 154, a bus 156, an interface 158, a storage apparatus 160 and a communication apparatus 162.

The CPU 150, which functions as an arithmetic processing unit and a control apparatus, controls the whole operation within the server 10 in accordance with various kinds of programs. Further, the CPU 150 implements a function of the control unit 100 at the server 10. Note that the CPU 150 includes a processor such as a microprocessor.

The ROM 152 stores programs, control data such as an operation parameter, or the like, to be used by the CPU 150.

The RAM 154 temporarily stores, for example, programs to be executed by the CPU 150.

The bus 156 includes a CPU bus, or the like. The bus 156 interconnects the CPU 150, the ROM 152 and the RAM 154.

The interface 158 connects the storage apparatus 160 and the communication apparatus 162 to the internal bus 156.

The storage apparatus 160 is an apparatus for data storage, which functions as the storage unit 122. The storage apparatus 160 includes, for example, a storage medium, a recording apparatus which records data in the storage medium, a readout apparatus which reads out data from the storage medium, a deletion apparatus which deletes data recorded in the storage medium, or the like.

The communication apparatus 162 is a communication interface including a communication device, or the like, for connecting to, for example, the communication network 36, or the like. Further, the communication apparatus 162 may be a communication apparatus supporting a wireless LAN, a communication apparatus supporting long term evolution (LTE) or a wired communication apparatus which performs communication in a wired manner. The communication apparatus 162 functions as the communication unit 120.

7. MODIFIED EXAMPLE

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, the steps of the operation according to each of the above-described embodiments do not necessarily have to be executed in the described order. For example, the order in which the steps are executed may be changed as appropriate. Further, the steps may be partially executed in parallel or individually instead of being executed in chronological order.

Further, according to the above-described embodiments, it is also possible to provide a computer program causing a computer system to perform functions equivalent to the functions of the respective components of the server 10 (more specifically, the control unit 100) according to the above-described embodiments. Here, the computer system may be a system in which a single computer (for example, hardware such as the CPU 150) executes a series of processes or a system in which a plurality of computers cooperatively execute a series of processes. Further, a recording medium in which the computer program is recorded is also provided.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An information processing apparatus, including: a control authority managing unit configured to change a control authority for a device
by a first user on a basis of whether or not a status is a monitored status.

(2)

The information processing apparatus according to (1), in which the monitored status is a status in which the device or the first user is under supervision of a second user having a management authority for the device, and the first user does not have the management authority for the device.

(3)

The information processing apparatus according to (2), in which the monitored status is a status in which a display unit configured to display a video obtained by imaging the device is located within a field of view of the second user.

(4)

The information processing apparatus according to (2), in which the monitored status is a status in which the device is located within a field of view of the second user.

(5)

The information processing apparatus according to (1), in which the monitored status is a status in which a second user having a management authority for the device is located in a space in which the device is located, and
the first user does not have the management authority for the device.

(6)

The information processing apparatus according to any one of (2) to (5), in which, in a case in which the status is the monitored status, the control authority managing unit grants the control authority for the device to the first user.

(7)

The information processing apparatus according to any one of (2) to (6), in which, in a case in which the status is not the monitored status, the control authority managing unit does not grant the control authority for the device to the first user.

(8)

The information processing apparatus according to any one of (2) to (7), in which, in a case in which the status is the monitored status, the control authority managing unit grants a first control authority for the device to the first user,
in a case in which the status is not the monitored status, the control authority managing unit grants a second control authority for the device to the first user, and
the second control authority is an authority narrower than the first control authority.

(9)

The information processing apparatus according to any one of (2) to (8), in which the control authority managing unit further changes the control authority for the device on a basis of a type of the device.

(10)

The information processing apparatus according to (9), in which, in a case in which the status is the monitored status, the control authority managing unit grants a first control authority for the device to the first user,
in a case in which the status is not the monitored status, the control authority managing unit grants a second control authority for the device to the first user,
the second control authority is an authority narrower than the first control authority, and
a relation between the first control authority and the second control authority is decided in accordance with the type of the device.

(11)

The information processing apparatus according to any one of (2) to (10), in which the control authority managing unit further changes the control authority of the device on a basis of a relation between the first user and the second user.

(12)

The information processing apparatus according to (11), in which, in a case in which control for the device by the first user is approved by the second user, the control authority managing unit grants the control authority for the device to the first user.

(13)

The information processing apparatus according to any one of (2) to (12), in which the control authority managing unit further changes the control authority for the device on a basis of whether or not a status is an emergency state.

(14)

The information processing apparatus according to any one of (2) to (13), in which the control authority managing unit further changes the control authority for the device on a basis of detection of a predetermined manipulation by the second user.

(15)

The information processing apparatus according to (14), further including
a notifying unit configured to give a notification of a request for granting the control authority for the device to the second user on a basis of detection of a predetermined manipulation by the first user in a case in which the status is not the monitored status, and
in the case in which the notification of the request is given, and the predetermined manipulation is performed by the second user, the control authority managing unit grants the control authority for the device to the first user.

(16)

The information processing apparatus according to any one of (2) to (14), further including,
a notifying unit configured to give a notification of a request for causing the second user to monitor the device on a basis of detection of a predetermined manipulation by the first user in a case in which the status is not the monitored status.

(17)

The information processing apparatus according to any one of (2) to (16), in which the first user is located at a remote site from a space in which the device is located, and control for the device is control for the device from the remote site.

(18)

The information processing apparatus according to any one of (2) to (17), further including, a device control unit configured to control the device on a basis of a detection result of a manipulation performed on the device by the first user and a grant state of the control authority for the device to the first user.

(19)

An information processing method, including:

changing, by a processor, a control authority for a device by a first user on a basis of whether or not a status is a monitored status.

(20)

A program causing a computer system to function as:

a control authority managing unit configured to change a control authority for a device by a first user on a basis of whether or not a status is a monitored status.

REFERENCE SIGNS LIST 10 server
20 user terminal
30 device
32 control apparatus
34 indoor camera
36 communication network
50 wearable camera
54 display unit
70 camera
100 control unit
102 device manipulation determining unit
104 monitored status determining unit
106 control authority managing unit
108 output control unit
110 notifying unit
112 device control unit
120 communication unit
122 storage unit

The invention claimed is:

1. An information processing apparatus, comprising:
a central processing unit (CPU) configured to:
determine one of a monitored status or a non-monitored status of one of a device or a first user, wherein
the one of the device or the first user is under supervision of a second user in the monitored status,
the second user has a management authority for the device, and
the first user does not have the management authority for the device;
grant a first control authority for the device to the first user based on the determination of the monitored status of the one of the device or the first user; and
grant a second control authority for the device to the first user based on the determination of the non-monitored status of the one of the device or the first user, wherein
the first control authority provides authority to control a first number of operations of the device,
the second control authority provides authority to control a second number of operations of the device, and
the second number of operations are less than the first number of operations.

2. The information processing apparatus according to claim 1, wherein
the monitored status is a status in which a display unit configured to display a video is located within a field of view of the second user, and
the video is obtained by imaging the device.

3. The information processing apparatus according to claim 1, wherein the monitored status is a status in which the device is located within a field of view of the second user.

4. The information processing apparatus according to claim 1, wherein
the monitored status is a status in which the second user having the management authority for the device is located in a space in which the device is located.

5. The information processing apparatus according to claim 1, wherein the CPU is further configured to change from one of the first control authority or the second control authority to other of the first control authority or the second control authority for the device based on a type of the device.

6. The information processing apparatus according to claim 5, wherein,
a relation between the first control authority and the second control authority is based on the type of the device.

7. The information processing apparatus according to claim 1, wherein the CPU is further configured to change from one of the first control authority or the second control authority to other of the first control authority or the second control authority for the device based on a relation between the first user and the second user.

8. The information processing apparatus according to claim 7, wherein, the CPU is further configured to grant the first control authority for the device to the first user based on an approval of the second user.

9. The information processing apparatus according to claim 1, wherein the CPU is further configured to change from the first control authority or the second control authority to other of the first control authority or the second control authority for the device based on an emergency state.

10. The information processing apparatus according to claim 1, wherein the CPU is further configured to change from the first control authority or the second control authority to other of the first control authority or the second control authority for the device based on a detection of a manipulation performed on the device by the second user.

11. The information processing apparatus according to claim 10, wherein
the CPU is further configured to notify a request to the second user based on a detection of a manipulation performed on the device by the first user in the non-monitored status, wherein the request is for the grant of the first control authority; and
grant the first control authority for the device to the first user based on the notification of the request and the detection of the manipulation performed on the device by the second user.

12. The information processing apparatus according to claim 1, wherein the CPU is further configured to
notify a request to the second user based on a detection of a manipulation performed on the device by the first user in the non-monitored status.

13. The information processing apparatus according to claim 1, wherein
   the first user is located at a remote site from a space in which the device is located, and
   the device is controllable by the first user from the remote site.

14. The information processing apparatus according to claim 1,
   wherein the CPU is further configured to control the device based on a detection result of a manipulation performed on the device by the first user and a grant state of the first control authority or the second control authority for the device to the first user.

15. An information processing method, comprising:
   determining, by a processor of an information processing apparatus, one of a monitored status or a non-monitored status of one of a device or a first user, wherein
      the one of the device or the first user is under supervision of a second user in the monitored status,
      the second user has a management authority for the device, and
      the first user does not have the management authority for the device;
   granting, by the processor, a first control authority for the device to the first user based on the determination of the monitored status of the one of the device or the first user; and
   granting, by the processor, a second control authority for the device to the first user based on the determination of the non-monitored status of the one of the device or the first user, wherein
      the first control authority provides authority to control a first number of operations of the device,
      the second control authority provides authority to control a second number of operations of the device, and
      the second number of operations are less than the first number of operations.

16. A non-transitory computer-readable medium having stored thereon computer-executable instructions which, when executed by a processor, cause the processor to execute operations, the operations comprising:
   determining one of a monitored status or a non-monitored status of one of a device or a first user, wherein
      the one of the device or the first user is under supervision of a second user in the monitored status,
      the second user has a management authority for the device, and
      the first user does not have the management authority for the device;
   granting a first control authority for the device to the first user based on the determination of the monitored status of the one of the device or the first user; and
   granting a second control authority for the device to the first user based on the determination of the non-monitored status of the one of the device or the first user, wherein
      the first control authority provides authority to control a first number of operations of the device,
      the second control authority provides authority to control a second number of operations of the device, and
      the second number of operations are less than the first number of operations.

* * * * *